US012741692B2

(12) United States Patent
Xu et al.

(10) Patent No.: US 12,741,692 B2
(45) Date of Patent: Sep. 22, 2026

(54) CONFLICT CONTROL METHOD FOR SHARED DRIVING, AND STORAGE MEDIUM AND ELECTRONIC DEVICE

(71) Applicant: JINGDONG KUNPENG (JIANGSU) TECHNOLOGY CO., LTD., Changshu (CN)

(72) Inventors: Xin Xu, Changshu (CN); Liangliang Zhang, Changshu (CN)

(73) Assignee: Jingdong Kunpeng (Jiangsu) Technology Co., Ltd., Changshu City (CN)

( * ) Notice: Subject to any disclaimer, the term of this patent is extended or adjusted under 35 U.S.C. 154(b) by 53 days.

(21) Appl. No.: 18/855,659

(22) PCT Filed: Nov. 24, 2022

(86) PCT No.: PCT/CN2022/134000
§ 371 (c)(1),
(2) Date: Oct. 10, 2024

(87) PCT Pub. No.: WO2023/197609
PCT Pub. Date: Oct. 19, 2023

(65) Prior Publication Data

US 2025/0229833 A1 Jul. 17, 2025

(30) Foreign Application Priority Data

Apr. 14, 2022 (CN) ........................ 202210414179.X

(51) Int. Cl.
*B62D 6/10* (2006.01)
*B60W 50/00* (2006.01)
(Continued)

(52) U.S. Cl.
CPC ............... *B62D 6/10* (2013.01); *B60W 50/00* (2013.01); *B60W 50/08* (2013.01); *B60W 50/10* (2013.01);
(Continued)

(58) Field of Classification Search
CPC ......... B62D 6/10; B60W 50/00; B60W 50/08; B60W 50/10; B60W 2050/0028; B60W 60/0054
See application file for complete search history.

(56) References Cited

U.S. PATENT DOCUMENTS

2005/0169361 A1 8/2005 Yousef et al.
2022/0017112 A1 1/2022 Liu et al.

FOREIGN PATENT DOCUMENTS

CN 110826192 A * 2/2020 ............. G06F 30/20
CN 111717207 A 9/2020
(Continued)

OTHER PUBLICATIONS

Ji et al., "Shared Steering Torque Control for Lane Change Assistance: A Stochastic Game-Theoretic Approach," Apr. 2019, IEEE Transactions on Industrial Electronics, vol. 66, No. 4, pp. 3093-3105.*

(Continued)

*Primary Examiner* — John M Zaleskas
(74) *Attorney, Agent, or Firm* — Qinghong Xu

(57) ABSTRACT

A conflict control method for shared driving, and an electronic device are provided. The method includes: establishing, based on a deterministic steering torque of a driver and a stochastic steering torque of the driver, a game model for human-machine path tracking control corresponding to a human-machine interaction behavior; obtaining human-machine torque conflict information by solving the game model for human-machine path tracking control; determining a
(Continued)

A game model for human-machine path tracking control corresponding to a human-machine interaction action is established based on a driver's deterministic steering torque and a driver's stochastic steering torque — S101

Human-machine torque conflict information is obtained by solving the game model for human-machine path tracking control — S102

A shared control strategy is determined based on the human-machine torque conflict information, and a vehicle is controlled based on the shared control strategy — S103 shared control strategy according to the human-machine torque conflict information; and controlling a shared driving vehicle according to the shared control strategy.

16 Claims, 7 Drawing Sheets

(51) Int. Cl.
*B60W 50/08* (2020.01)
*B60W 50/10* (2012.01)
*B60W 60/00* (2020.01)

(52) U.S. Cl.
CPC . *B60W 60/0054* (2020.02); *B60W 2050/0028* (2013.01)

(56) References Cited

FOREIGN PATENT DOCUMENTS

| | | | |
|---|---|---|---|
| CN | 112373470 | A | 2/2021 |
| CN | 112721943 | A | 4/2021 |
| CN | 113200056 | A | 8/2021 |
| CN | 113359688 | A | 9/2021 |
| CN | 114834469 | A | 8/2022 |
| DE | 102018117412 | A1 | 1/2020 |

OTHER PUBLICATIONS

Na et al., "Modelling of a Human Driver's Interaction with Vehicle Automated Steering Using Cooperative Game Theory," Sep. 2019, IEEE/CAA Journal of Automatica Sinica, vol. 6, No. 5, pp. 1095-1107.*
Cole et al., "Application of Open-Loop Stackelberg Equilibrium to Modeling a Driver's Interaction with Vehicle Active Steering Control in Obstacle Avoidance," Oct. 2017, IEEE Transactions on Human-Machine Systems, vol. 47, No. 5, pp. 673-685.*
International Search Report dated Jan. 28, 2023 of International Application No. PCT/CN2022/134000.
Seyed Hossein Tamaddoni et al., Optimal preview game theory approach to vehicle stability controller design, Vehicle System Dynamics, vol. 49, No. 12, published in Dec. 2011, p. 1967-1979.
Xiaoxiang Na and David J. Cole, Application of Open-Loop Stackelberg Equilibrium to Modeling a Driver's Interaction with Vehicle Active Steering Control in Obstacle Avoidance, IEEE Transactions on Human-Machine Systems, published in 2017, p. 1-13.
Xiaoxiang Na and David J. Cole, Game-Theoretic Modeling of the Steering Interaction Between a Human Driver and a Vehicle Collision Avoidance Controller, IEEE Transactions on Human-Machine Systems, vol. 45, No. 1, published in Feb. 2015, p. 25-38.
Rui Liu et al., Cooperative Driving Strategy Based on Non-cooperative Model Predictive Control, Journal of Tongji University(Natural Science), vol. 47, No. 7, published in Jul. 2019, p. 1037-1045.
Lu Zhao, The Study of the Mechanism of Situational Decision in Human-machine Interaction, Thesis for Master Degree, Beijing University of Posts and Telecommunications, published on Mar. 21, 2018.
Michael Flad et al., Necessary and sufficient conditions for the design of cooperative shared control, 2014 IEEE International Conference on Systems, Man, and Cybernetics, published in Oct. 2014, p. 1253-1259.
Michael Flad et al., Steering driver assistance system A systematic cooperative shared control design approach, 2014 IEEE International Conference on Systems, Man, and Cybernetics, published in Oct. 2014, p. 3585-3592.
Michael Flad et al., Cooperative Shared Control Driver Assistance Systems Based on Motion Primitives and Differential Games, IEEE Transactions on Human-Machine Systems, published in 2017, p. 1-12.
1st Office Action dated Apr. 3, 2025 of Chinese Application No. 202210414179.X.
Xiaoxiang Na and David J. Cole, Game-Theoretic Modeling of the Steering Interaction Between a Human Driver and a Vehicle Collision Avoidance Controller, IEEE Transactions on Human-Machine Systems, vol. 45, No. 1, published in Feb. 2015.
1st Office Action dated Dec. 16, 2025 of Japanese Application No. 2024-560617.
Extended European Search Report dated Mar. 11, 2026 of European Application No. 22937241.2.
Kaiming Yang et al., Application of Stackelberg Game Theory for Shared Steering Torque Control in Lane Change Maneuver, 2018 IEEE Intelligent Vehicles Symposium (IV), Changshu, Suzhou, China, Jun. 26-30, 2018, p. 138-143.
Wenshuo Wang et al., Decision-Making in Driver-Automation Shared Control: A Review and Perspectives, IEEE/CAA Journal of Automatica Sinica, vol. 7, No. 5, published in Sep. 2020, p. 1289-1307.

* cited by examiner

Autonomous driving system Target trajectory
Autonomous driving system
Steering manipulate
State feedback
Cooperative vehicle infrastructure system
Steering action interaction
Driver Target trajectory
Driver
Steering manipulate
State feedback Driver target trajectory Vehicle lateral displacement Vehicle travelling trajectory Autonomous driving system target trajectory Vehicle longitudinal displacement

X

CONFLICT CONTROL METHOD FOR SHARED DRIVING, AND STORAGE MEDIUM AND ELECTRONIC DEVICE

CROSS REFERENCE TO RELATED APPLICATIONS

This application is a U.S. national phase application of International Application No. PCT/CN2022/134000 filed on Nov. 24, 2022, which claims priority to Chinese Patent Application No. 202210414179.X, filed on Apr. 14, 2022 and entitled "CONFLICT CONTROL METHOD AND APPARATUS FOR SHARED DRIVING, AND STORAGE MEDIUM AND ELECTRONIC DEVICE", the entire contents of which are incorporated herein by reference for all purposes.

TECHNICAL FIELD

The present disclosure relates to the field of autonomous driving technology, in particular to a conflict control method for shared driving, a storage medium, and an electronic device.

BACKGROUND

Both the autonomous driving system and the driver in the shared driving are intelligent agents, and both will make judgments and decisions based on their own understanding of the scene. Therefore, in the shared driving, in addition to the human-machine steering conflict caused by the difference in preview actions between the control levels of the human and the machine, another major cause of the human-machine conflict is the disagreement between decision-making levels of the human and the machine. That is, there is difference in the target trajectories planned by the driver and the autonomous driving system, which leads to the steering torque conflict.

It should be noted that the information disclosed in the above section is only for enhancement of understanding of the background of the present disclosure, and thus may contain information that does not form the prior art already known to those of ordinary skill in the art.

SUMMARY

According to a first aspect of the present disclosure, a conflict control method for shared driving is provided. The conflict control method for shared driving includes: establishing, based on a driver's deterministic steering torque and a driver's stochastic steering torque, a game model for human-machine path tracking control corresponding to a human-machine interaction action; obtaining human-machine torque conflict information by solving the game model for human-machine path tracking control; determining a shared control strategy based on the human-machine torque conflict information; and controlling a vehicle based on the shared control strategy.

According to a second aspect of the present disclosure, a conflict control apparatus for shared driving is provided. The conflict control apparatus for shared driving includes: a modeling module configured to establish, based on a driver's deterministic steering torque and a driver's stochastic steering torque, a game model for human-machine path tracking control corresponding to a human-machine interaction action; a solving module configured obtain human-machine torque conflict information by solving the game model for human-machine path tracking control; and an application module configured to determine a shared control strategy based on the human-machine torque conflict information, and control a vehicle based on the shared control strategy.

According to a third aspect of the present disclosure, a computer-readable storage medium is provided. The computer-readable storage medium stores a computer program, which when executed by a processor, causes the conflict control method for shared driving as described in the above embodiments to be implemented.

According to a fourth aspect of the present disclosure, an electronic device is provided. The electronic device includes: one or more processors; and a storage unit for storing one or more programs, which when executed by one or more processors, cause the one or more processors to implement the conflict control method for shared driving as described in the above embodiments.

It should be understood that the above general description and the following detailed description are only illustrative and explanatory, and do not limit the present disclosure.

BRIEF DESCRIPTION OF THE DRAWINGS

The drawings, which are incorporated in and constitute a part of the specification, illustrate embodiments consistent with the present disclosure and together with the specification serve to explain the principles of the disclosure. Obviously, the drawings in the following descriptions are only some embodiments of the present disclosure, and for those of ordinary skill in the art, other drawings can also be obtained from these drawings without creative efforts, in which.

DETAILED DESCRIPTION

Figures 1, 2:
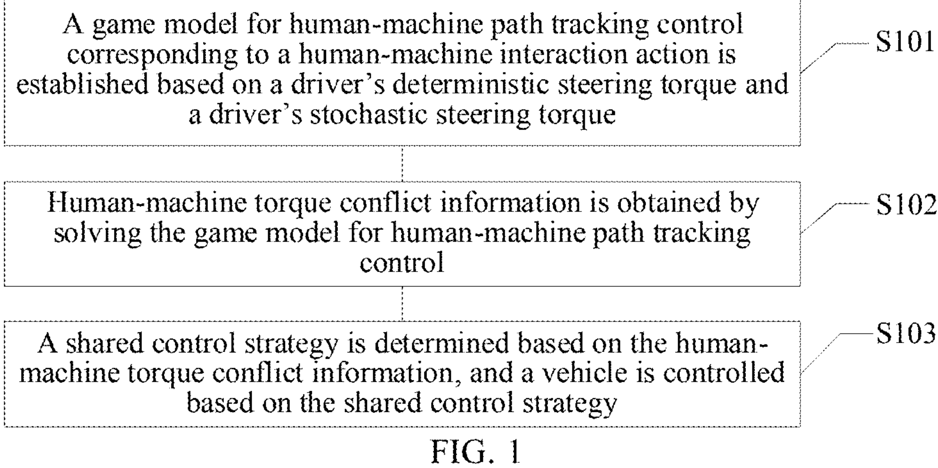
FIG. 1 shows a schematic flowchart of a conflict control method for shared driving according to one or more embodiments of the present disclosure.
FIG. 2 shows a schematic diagram of a principle of steering interaction in a shared driving system according to one or more embodiments of the present disclosure.

Example embodiments will now be described more fully with reference to the drawings. Example embodiments, however, can be embodied in various forms and should not be construed as limited to the examples set forth herein. Instead, these embodiments are provided so that the present disclosure will be thorough and complete, and will fully convey the concept of example embodiments to those skilled in the art.

In addition, the described features, structures, or characteristics can be combined in any suitable manner in one or more embodiments. In the following description, numerous specific details are provided in order to give a thorough understanding of the embodiments of the present disclosure. However, those skilled in the art will appreciate that the technical solutions of the present disclosure can be practiced without one or more of the specific details, or other methods, components, devices, steps, etc., can be employed. In other instances, well-known methods, devices, implementations, or operations have not been shown or described in detail to avoid obscuring aspects of the present disclosure.

The block diagrams shown in the drawings are functional entities and do not necessarily correspond to physically separate entities. These functional entities can be implemented in software, or in one or more hardware modules or integrated circuits, or in different networks and/or processor devices and/or microcontroller devices.

The flowcharts shown in the drawings are merely illustrative and do not necessarily include all contents and operations/steps, nor do they have to be executed in the order described. For example, some operations/steps can be decomposed, and some operations/steps can be combined or partially combined, thus an actual execution order may be changed according to actual situations.

In the human-machine dual-agent system, the driver and the autonomous driving system will simultaneously manipulate the actuator and change the vehicle state to achieve their goals, respectively. These redundancy inputs will inevitably cause the human-machine interaction conflict, which seriously affects the safety, comfort, power and fuel cost of the vehicle.

The game theory is an effective means of describing and understanding the interaction conflict between two parties in the multi-agent system, providing effective theoretical methods for quantitative modeling of the human-machine interaction, resolution of the human-machine conflict, and inference of the true intentions of the driver.

For the path tracking control problem in shared driving, both the autonomous driving system and the driver are intelligent agents, and both will make judgments and decisions based on their own understanding of the scene. Therefore, in the shared driving, in addition to the human-machine steering conflict caused by the difference in preview actions between the control levels of the human and the machine, another major cause of the human-machine conflict is the disagreement between decision-making levels of the human and the machine. That is, there is difference in the target trajectories planned by the driver and the autonomous driving system, which leads to the steering torque conflict.

On the one hand, in the modeling of the human-machine interaction mechanism, especially in the modeling process of the human-machine interaction under extreme vehicle conditions (such as human-machine collaborative emergency avoidance), it is difficult to directly apply linear dynamic models to describe human-machine interaction action. Many nonlinear methods, such as nonlinear prediction methods, local linearization methods, and piecewise affine methods, have been applied to deal with model mismatch problems under extreme vehicle conditions. However, nonlinear prediction methods often have poor real-time performance due to their high computational complexity. Although local linearization or piecewise affine methods can ensure the real-time performance of the algorithm, these methods inevitably cause the control strategy to switch back and forth within different linearization intervals, resulting in uneven human-machine interaction results, and even the sliding mode phenomena that switches back and forth near linear interval points. On the other hand, for the multi-agent dynamics system, the dynamic non-cooperative game theory can also be applied. However, current research on the game theory in shared driving systems is mainly limited to the design of shared control strategies, and there is no comprehensive theoretical description of the mapping relationship between the human-machine decision divergence and the control conflict.

The present disclosure studies and focuses on the human-machine interaction mechanism from decision divergence to control conflict. Due to the presence of both certain steering resistance torque and uncertain steering torque from the driver in the coupled human-machine steering dynamics system, the present disclosure proposes a new stochastic game theory framework that considers deterministic and stochastic steering torques, and Nash and Stackelberg equilibria is planned to be employed under different information modes to fully describe such mapping relationship, so as to design a theoretical bridge connecting the human-machine decision divergence and the control conflict, overcome the human-machine decision confusion problem shared driving systems, and provide theoretical basis for the design of shared control strategies.

Detailed explanations of technical solutions in embodiments of the present disclosure will be provided in the following.

FIG. 1 shows a schematic flowchart of a conflict control method for shared driving according to one or more embodiments of the present disclosure. As shown in FIG. 1, the conflict control method for shared driving includes steps S101 to S103.

In step S101, a game model for human-machine path tracking control corresponding to a human-machine interaction action is established based on a driver's deterministic steering torque and a driver's stochastic steering torque.

In step S102, human-machine torque conflict information is obtained by solving the game model for human-machine path tracking control.

In step S103, a shared control strategy is determined based on the human-machine torque conflict information, and a vehicle is controlled based on the shared control strategy.

In some embodiments of the present disclosure, the game model for human-machine path tracking control corresponding to the human-machine interaction action is established based on the driver's deterministic steering torque and the driver's stochastic steering torque, and the game model for human-machine path tracking control is solved to obtain the human-machine torque conflict information for vehicle control. On the one hand, the uncertain action of the driver can be incorporated into the human-machine path tracking control, making it more in line with practical scenario requirements and achieving more accurate control effects. On the other hand, the human-machine torque conflict information obtained from solving the game model is an accurate description of the human-machine interaction action from decision divergence to control conflict in the shared driving model, which can overcome the problem of human-machine decision confusion in the shared driving system, provide theoretical basis for the design of shared control strategies, and further optimize the results of the vehicle control.

More detailed explanations to the steps of the conflict control method for shared driving in the present disclosure will be provided in the following with reference to the drawings and embodiments.

In step S101, a game model for human-machine path tracking control corresponding to a human-machine interaction action is established based on a driver's deterministic steering torque and a driver's stochastic steering torque.

In some embodiments, the game model for human-machine path tracking control for solving the human-machine interaction action is first established. The game model for human-machine path tracking control can adopt a non-cooperative game theory framework.

FIG. 2 shows a schematic diagram of a principle of steering interaction in a shared driving system according to one or more embodiments of the present disclosure. As shown in FIG. 2, both the driver and the autonomous driving system (hereinafter referred to as driving system) will generate corresponding steering manipulate actions according to their own target trajectory. At the same time, both the driver and the driving system can perceive decisions from each other through the steering system and the whole vehicle movement state, and thus, for the driver, in order to achieve the decision-making goal of himself, the steering manipulate action of the driver further includes the response to the steering action of the driving system. Therefore, when designing the controller of the driving system, the steering control input from the driver should also be fully considered. Therefore, in the shared driving system, the modeling of the human-machine steering conflict must consider the interaction of the human-machine steering action, especially under the condition of divergence of human-machine decision-making goals, where the steering action of the driver is not only based on his own decision-making goal, but also actively compensates the steering action of the autonomous driving system, which is quite different from pure manual driving.

Since the steering actions of the driver and the autonomous driving system in the process of shared driving are both aimed at minimizing the tracking error of each track, and their respective steering actions are generated according to the state feedback of the cooperative vehicle infrastructure system and the steering action of the other party, there are inevitably conflicts between the target trajectories of respective decision-making layers of the human and the machine, then the human-machine interaction process under such condition can be described through the non-cooperative game theory framework.

Figure 3:
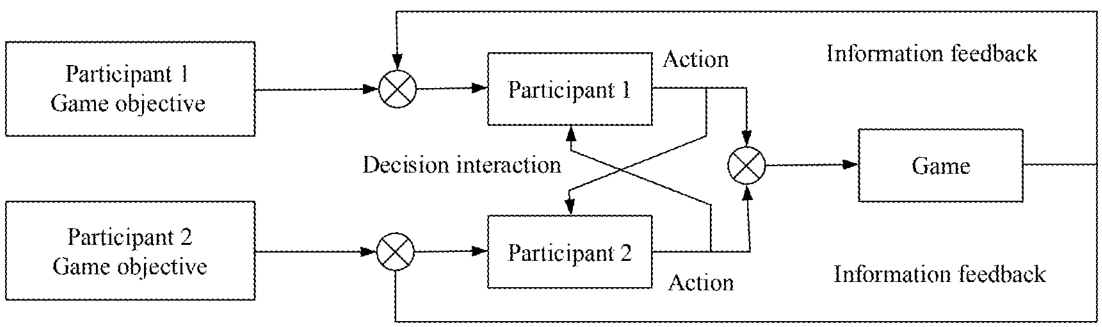
FIG. 3 shows a schematic diagram of a principle of a non-cooperative game for a shared driving system according to one or more embodiments of the present disclosure.

FIG. 3 shows a schematic diagram of a principle of a non-cooperative game for a shared driving system according to one or more embodiments of the present disclosure. As shown in FIG. 3, the driver and the driving system are considered as game participants, with both parties aiming to maximize their respective interests, to generate their own actions by integrating the state information of the game process and the actions of the other party.

When the shared driving is studied using the game theory, the optimal control strategy based on the cost function is used to describe the trajectory tracking actions of the driver and the autonomous driving system. Since the sum of the cost functions of the driver and the autonomous driving system is non-zero, and since the optimal trajectory tracking control is usually described using the prediction time domain and the control time domain, the trajectory tracking problem of the shared driving can be abstracted as a multi-stage dynamic game problem with a non-zero sum. For the multi-stage dynamic game with the non-zero sum, the game problem can be divided into two categories, namely the closed-loop memoryless dynamic game problem and the open-loop dynamic game problem, based on the information mode of the game.

Figure 4:
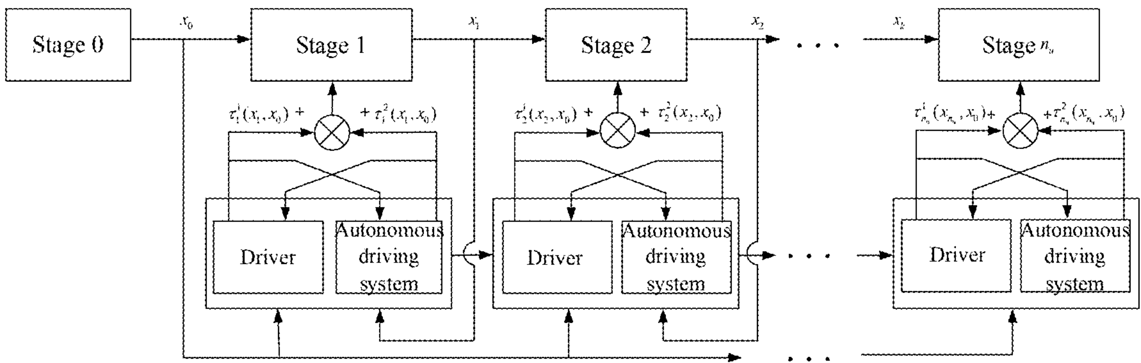
FIG. 4 shows a schematic diagram of a principle of a closed-loop dynamic game for a shared driving system according to one or more embodiments of the present disclosure.

FIG. 4 shows a schematic diagram of a principle of a closed-loop dynamic game for a shared driving system according to one or more embodiments of the present disclosure. As shown in FIG. 4, in this information mode, the permissible strategy set of the participant is mapped through the initial state and the states of each stage, while "memoryless" means that the participant only knows the initial state and the current state of the system when making decisions in each stage, and has no memory of the states of the other stages. Therefore, the action of the participant in stage i can be expressed as $$\tau_i^1(x_i, x_0),\ \tau_i^2(x_i, x_0),\ i \in \{0, 1, \ldots, n_u\}.$$

Figure 5:
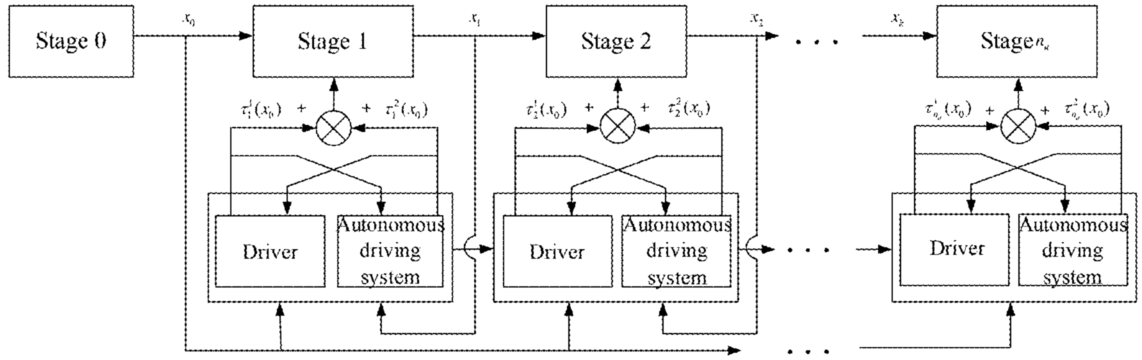
FIG. 5 shows a schematic diagram of a principle of an open-loop dynamic game for a shared driving system according to one or more embodiments of the present disclosure.

The opposite of the closed-loop memoryless dynamic games is the open-loop dynamic games. FIG. 5 shows a schematic diagram of a principle of an open-loop dynamic game for a shared driving system according to one or more embodiments of the present disclosure. As shown in FIG. 5, the entire game process is divided into $n_u$ stages, and the state vector of the system in each stage is $x_k$. The permissible strategy set of the participant in each stage is only related to the initial state. Therefore, when the initial state $x_0$ is given, the strategy set is a constant function, and the action of the participant in stage i also become constant values $$\tau_i^1,\ \tau_i^2,\ i \in \{0, 1, \ldots, n_u\}.$$

Therefore, in the step S101, the game model for human-machine path tracking control in two different (closed-loop and open-loop) information modes can be established separately.

1. Closed-Loop Game Model for Human-Machine Path Tracking Control

Figures 6, 7:
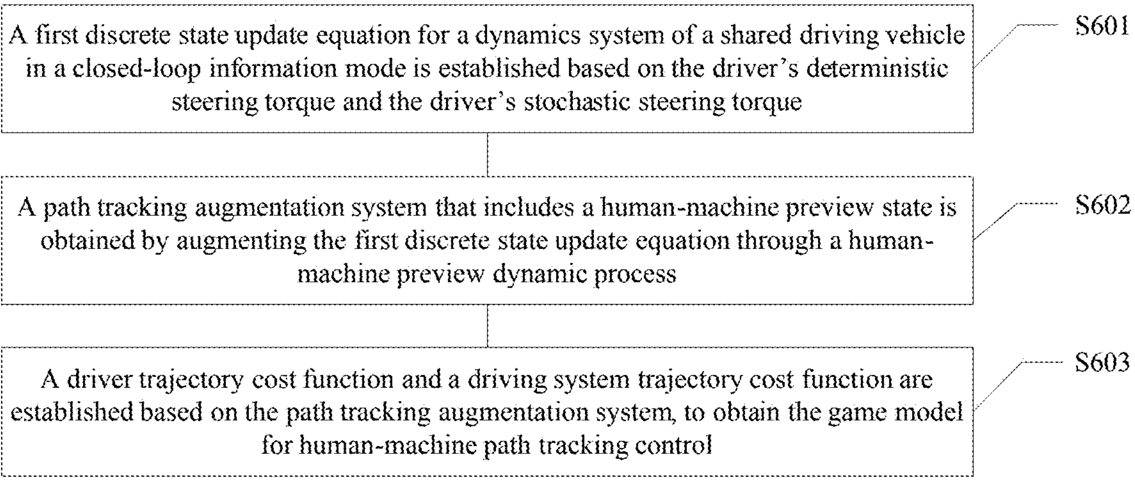
FIG. 6 shows a schematic flowchart of a method for establishing a closed-loop game model for human-machine path tracking control according to one or more embodiments of the present disclosure.
FIG. 7 shows a schematic diagram of a principle of a multi-point preview mode according to one or more embodiments of the present disclosure.

FIG. 6 shows a schematic flowchart of a method for establishing a closed-loop game model for human-machine path tracking control according to one or more embodiments of the present disclosure, which uses the Linear Quadratic Regulator (LQR) method with optimal multi-point preview to describe the steering actions of the driver and the driving system. As shown in FIG. 6, the method for establishing the game model for human-machine path tracking control includes the following steps.

In step S601, a first discrete state update equation for a dynamics system of a shared driving vehicle in a closed-loop information mode is established based on the driver's deterministic steering torque and the driver's stochastic steering torque.

In step S602, a path tracking augmentation system that includes a human-machine preview state is obtained by augmenting the first discrete state update equation through a human-machine preview dynamic process.

In step S603, a driver trajectory cost function and a driving system trajectory cost function are established based on the path tracking augmentation system, to obtain the game model for human-machine path tracking control.

In some embodiments, this section focuses on the modeling of the human-machine interaction. Therefore, it can be assumed that both the target trajectories of the human and the machine have a small tangent direction angle. Under the condition of a small heading angle, the state vector in the model can be simplified as $x_c=[\theta_{sw}\ \dot{\theta}_{sw}\ \dot{\psi}\ Y\ \psi]^T$, where $\theta_{sw}$ is the angel, $\dot{\theta}_{sw}$ is the derivative of $\theta_{sw}$ with respect to time, Y is the global coordinate of the mass center of the vehicle, $\psi$ is the heading angle of the vehicle, and $\dot{\psi}$ is the derivative of $\psi$ with respect to time.

In step S601, a first discrete state update equation for a dynamics system of a shared driving vehicle in a closed-loop information mode is established based on the driver's deterministic steering torque and the driver's stochastic steering torque.

The driver's deterministic steering torque is denoted as $\xi^h$, the driver's stochastic steering torque is denoted as $\tau^{hsto}$, and the steering torque of the driving system is denoted as $\tau^m$. The continuous state space equation is established based on the state vector $x_c$, the driver's deterministic steering torque is denoted as $\tau^h$, and the driver's stochastic steering torque is denoted as $\tau^{hsto}$, as shown in formula (1):

$$\begin{cases} \dot{x}_c = A_c x_c + B_h\left(\tau^h + \tau^{hsto}\right) + B_m \tau^m + N_c \tau_{disk} \\ y_c = C_c x_c \end{cases} \tag{1}$$

where $\tau_{disk}$ is the steering torque related to the distance, $A_c$, $B_h$, $B_m$, $N_c$, and $C_c$ are all parameter matrices in the model, as shown in the following:

$$A_c = \begin{bmatrix} 0 & 1 & 0 & 0 & 0 & 0 \\ -\frac{B_{eq}}{J_{eq}} & -\frac{B_{eq}}{J_{eq}} & 0 & 0 & 0 & 0 \\ b_1 & 0 & a_{11} & a_{12} & 0 & 0 \\ b_2 & 0 & a_{21} & a_{21} & 0 & 0 \\ 0 & 0 & 1 & 0 & 0 & v_x \\ 0 & 0 & 0 & 1 & 0 & 0 \end{bmatrix}, B_h = \begin{bmatrix} 0 \\ \frac{1}{J_{eq}} \\ 0 \\ 0 \\ 0 \\ 0 \end{bmatrix},$$

-continued $$B_m = \begin{bmatrix} 0 \\ \frac{1}{J_{eq}} \\ 0 \\ 0 \\ 0 \\ 0 \end{bmatrix}, N_c = \begin{bmatrix} 0 \\ -\frac{1}{J_{eq}} \\ 0 \\ 0 \\ 0 \\ 0 \end{bmatrix}, C_c = \begin{bmatrix} 0 & 0 \\ 0 & 0 \\ 0 & 0 \\ 0 & 0 \\ 1 & 0 \\ 0 & 1 \end{bmatrix}^T.$$

In order to describe the shared driving problem as a multi-stage game, by discretizing the above continuous system at the system discretization time $T_s$, the dynamics system of the shared driving vehicle can be transformed into the following difference equation, namely the first discrete state update equation, as shown in formula (2):

$$\begin{cases} x_{c(k+1)} = A_{cd} x_{ck} + B_{hd}\tau_k^h + B_{md}\tau_k^m + N_{cd}\tau_{disk} + B_{hd}\tau_k^{hsto}) \\ y_{ck} = C_c x_{ck} \end{cases} \tag{2}$$

where $A_{cd} = e^{A_c T_s}$, $B_{hd} = B_h \int_0^{T_s} e^{A_c \tau} d\tau$, $$B_{md} = B_m \int_0^{T_s} e^{A_c \tau} d\tau,\ N_{cd} = N_c \int_0^{T_s} e^{A_c \tau} d\tau,\ \tau_k^h$$

is the driver's deterministic steering torque at time instant k in the shared driving system, $$\tau_k^m$$

is the steering torque from the driving system at instant k, $\tau^{hsto}$ is the driver's stochastic steering torque, and $\tau_{disk}$ is the steering torque related to the distance.

In step S602, a path tracking augmentation system that includes a human-machine preview state is obtained by augmenting the first discrete state update equation through a human-machine preview dynamic process.

FIG. 7 shows a schematic diagram of a principle of a multi-point preview mode according to one or more embodiments of the present disclosure. In order to model the path tracking control system based on LQR method, and to consider the predictive actions of the human and the machine on vehicle dynamics, the human-machine preview action is first modeled as a multi-point preview mode as shown in FIG. 7. As shown in FIG. 7, the driver and the driving system preview a section area of their respective target trajectories based on their own decisions at each moment. This section area can be described as $n_p$ preview points, and the preview distance is determined by the driver's preview time $t_p$, where $t_p=n_p \times T_s$. This dynamic process can be expressed using a shift register, as shown in formula (3):

$$R_{x(k+1)} = A_r R_{xk} + B_r r_{xk}^{pre} \tag{3}$$

where $r_{x(k+i)} = [Y_x(k+i)\,\psi_x(k+i)]^T$, $r_x^{pre} = [Y_x(k+n_p)\,\psi_x(k+n_p)]^T$, $R_{xk} = \begin{bmatrix} r_{xk} & r_{x(k+1)} & \cdots & r_{x(k+n_p-1)} \end{bmatrix}^T$, $x \in \{h, m\}$, $$A_r = \begin{bmatrix} 0 & I_{2\times2} & \cdots & 0 \\ \vdots & \vdots & \ddots & \vdots \\ 0 & 0 & \cdots & I_{2\times2} \\ 0 & 0 & \cdots & 0 \end{bmatrix}, B_r = \begin{bmatrix} 0 \\ \vdots \\ 0 \\ I_{2\times2} \end{bmatrix}.$$

By augmenting the human-machine shared vehicle dynamics system through the human-machine preview dynamic process $$R_{x(k+1)} = A_r R_{xk} + B_r r_{xk}^{pre},$$

the path tracking augmentation system that includes the human-machine preview state can be obtained, as shown in formula (4):

$$x_{k+1} = Ax_k + B_1\tau_k^h + B_2\tau_k^m + N\tau_{disk} + B_1\tau_k^{hsto} + F_c R_k^{pre} \tag{4}$$

$$\text{where } x_k = [x_{ck} R_{hk} R_{mk}]^T,\ R_k^{pre} = [r_h^{pre} r_m^{pre}]^T,$$

$$A_r = \begin{bmatrix} A_{cd} & 0 & 0 \\ 0 & A_r & 0 \\ 0 & 0 & A_r \end{bmatrix},\ B_1 = \begin{bmatrix} B_{hd} \\ 0 \\ 0 \end{bmatrix},$$

$$B_2 = \begin{bmatrix} B_{md} \\ 0 \\ 0 \end{bmatrix},\ N = \begin{bmatrix} N_{cd} \\ 0 \\ 0 \end{bmatrix},\ F_c = \begin{bmatrix} 0 & B_r & 0 \\ 0 & 0 & B_r \end{bmatrix}^T.$$

In formula (4), let $$c_k = N\tau_{disk},\ \theta_k = B_1\tau_k^{hsto},\ R_k^{pre}$$

be the lateral displacement and the heading angle of the farthest preview point in the preview areas of the driver and the driving system. Since the preview information of the driver and the driving system in other areas is all in the augmented state $x_k$, the farthest preview point information $$R_k^{pre}$$

can be omitted, and the path tracking augmentation system can be further simplified as shown in formula (5):

$$x_{k+1} = Ax_k + B_1\tau_k^h + B_2\tau_k^m + c_k + \theta_k \tag{5}$$

In step S603, a driver trajectory cost function and a driving system trajectory cost function are established based on the path tracking augmentation system, to obtain the game model for human-machine path tracking control.

In some embodiments, in the path tracking augmentation system for the human-machine decision divergence, a driver trajectory cost function $J_1$ and a driving system trajectory cost function $J_2$ with the step of $n_u$ for both the prediction time domain and the control time domain are designed, to obtain the game model for human-machine path tracking control, which can be described as formula (6):

$$J_1 = \frac{1}{2}x_{k+n_u}^T Q_1 x_{k+n_u} + \frac{1}{2}\sum_{j=0}^{n_u-1}\left(x_{k+j}^T Q_1 x_{k+j} + \tau_{k+j}^{hT} R_{11}\tau_{k+j}^h + \tau_{k+j}^{mT} R_{12}\tau_{k+j}^m\right) \tag{6}$$

$$J_2 = \frac{1}{2}x_{k+n_u}^T Q_2 x_{k+n_u} + \frac{1}{2}\sum_{j=0}^{n_u-1}\left(x_{k+j}^T Q_2 x_{k+j} + \tau_{k+j}^{hT} R_{21}\tau_{k+j}^h + \tau_{k+j}^{mT} R_{22}\tau_{k+j}^m\right)$$

-continued $$\text{where } Q_1 = H_1^T W_1 H_1,\ Q_2 = H_2^T W_2 H_2,$$

$$H_1 = \begin{bmatrix} 0 & 0 & 0 & 0 & 1 & 0 & -1 & 0 & \ldots & 0 & 0 & \ldots \\ 0 & 0 & 0 & 0 & 0 & 1 & 0 & -1 & \ldots & 0 & 0 & \ldots \end{bmatrix},\ W_1 = \begin{bmatrix} q_{Y_1} & 0 \\ 0 & q_{\psi_1} \end{bmatrix},$$

$$H_2 = \begin{bmatrix} 0 & 0 & 0 & 0 & 1 & 0 & 0 & 0 & \ldots & -1 & 0 & \ldots \\ 0 & 0 & 0 & 0 & 0 & 1 & 0 & 0 & \ldots & 0 & -1 & \ldots \end{bmatrix},\ W_2 = \begin{bmatrix} q_{Y_2} & 0 \\ 0 & q_{\psi_2} \end{bmatrix}$$

where $Q_1$ and $Q_2$ are respectively the state weighting matrices for the driver and the driving system, $W_1$ and $W_2$ are respectively the tracking error weighting matrices for the driver and the driving system, $q_{Y_1}$ and $q_{\Psi_1}$ are respectively the weighting coefficients for the lateral tracking error and the heading angle error of the driver's vehicle, $q_{Y_2}$ and $q_{\Psi_2}$ are respectively the weighting coefficients for the lateral tracking error and the heading angle error of the driving system's vehicle, $R_{11}$ and $R_{22}$ are respectively the input weighting coefficients for the driver and the driving system, $R_{11}=q_{u1}$, $R_{22}=q_{u2}$, and $R_{12}$ and $R_{21}$ are respectively the interactive input weighting coefficients for the driver and the driving system, $R_{12}=q_{u12}$, $R_{21}=q_{u21}$.

Based on this, the formula (6) establishes the game model for human-machine path tracking control at the $$n_u^{th}$$

stage through a linear quadratic method. The cost functions of both parties include the steering control input from the other party, to express the human-machine interaction characteristics.

2. Open-Loop Game Model for Human-Machine Path Tracking Control

Figure 8:
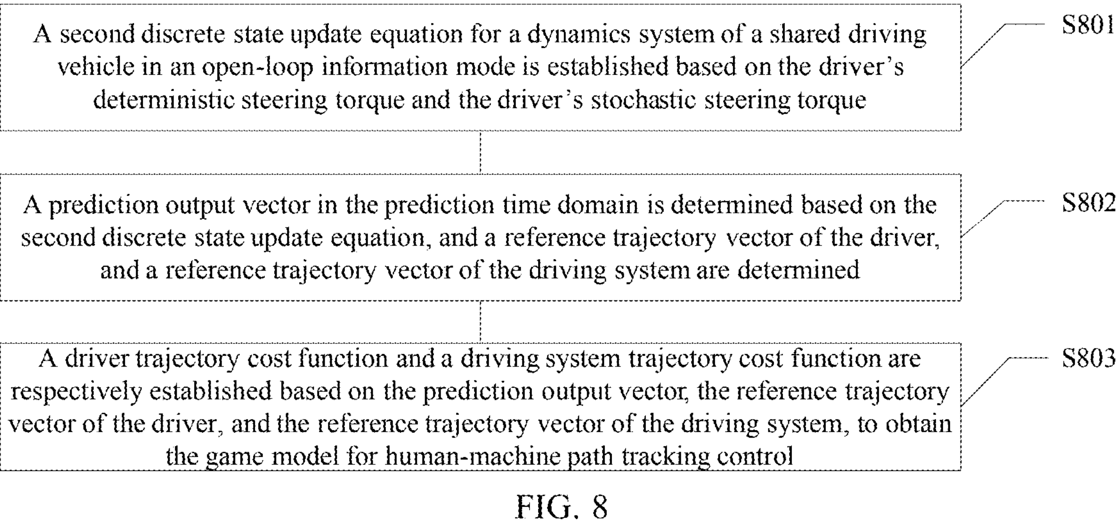
FIG. 8 shows a schematic flowchart of a method for establishing an open-loop game model for human-machine path tracking control according to one or more embodiments of the present disclosure.

FIG. 8 shows a schematic flowchart of a method for establishing an open-loop game model for human-machine path tracking control according to one or more embodiments of the present disclosure, which uses the Distributed Model Predictive Control (DMPC) strategy to describe the mapping relationship between the human-machine decision divergence and the steering torque conflict in the open-loop information mode. As shown in FIG. 8, the method for establishing the game model for human-machine path tracking control includes the following steps.

In step S801, a second discrete state update equation for a dynamics system of a shared driving vehicle in an open-loop information mode is established based on the driver's deterministic steering torque and the driver's stochastic steering torque.

In step S802, a prediction output vector in the prediction time domain is determined based on the second discrete state update equation, and a reference trajectory vector of the driver, and a reference trajectory vector of the driving system are determined.

In step S803, a driver trajectory cost function and a driving system trajectory cost function are respectively established based on the prediction output vector, the reference trajectory vector of the driver, and the reference trajectory vector of the driving system, to obtain the game model for human-machine path tracking control.

In some embodiments, under the framework of the model prediction control, both the driver and the driving system estimate the vehicle trajectory within the prediction time domain $n_p$, and apply the steering control within the control time domain $n_u$, to minimize the deviation between the vehicle trajectory and their respective decisions. Compared with the linear quadratic regulator method, the model prediction control more intuitively reflects in the final interaction model the target trajectories planned by the decision-making levels of the driver and the autonomous driving system. Meanwhile, according to the model prediction control algorithm, the establishment of the state prediction vector in the cost function is based on the current state of the system and the control input within the control time domain $n_u$. Therefore, the control law is only related to the current initial state, which precisely conforms to the definition of the open-loop information mode.

In step S801, a second discrete state update equation for a dynamics system of a shared driving vehicle in an open-loop information mode is established based on the driver's deterministic steering torque and the driver's stochastic steering torque.

For the dynamics system of the shared driving vehicle, the uncertain action of the driver is incorporated into the system interference, which results in the second discrete state update equation as shown in formula (7):

$$\begin{cases} x_{c(k+1)} = A_{cd}x_{ck} + B_{hd}\tau_k^h + B_{md}\tau_k^m + N_{cd}(\tau_{disk} - \tau^{hsto}) \\ y_{ck} = C_c x_{ck} \end{cases} \quad (7)$$

where $A_{cd} = e^{A_c T_s}$, $B_{hd} = B_h \int_0^{T_s} e^{A_c \tau} d\tau$, $$B_{md} = B_m \int_0^{T_s} e^{A_c \tau} d\tau,\ N_{cd} = N_c \int_0^{T_s} e^{A_c \tau} d\tau,\ \tau_k^h$$

is the driver's deterministic steering torque in the shared driving system at time instant k, $$\tau_k^m$$

is the steering torque from the driving system at time instant k, $\tau^{hsto}$ is the driver's stochastic steering torque, $\tau_{disk}$ is the steering torque related to the distance, and the interference input is recorded as $$w_k' = (\tau_{disk} - \tau^{hsto}).$$

Based on the above second discrete state update equation, if it is assumed that the interference input $w'_k$ in the prediction time domain remains unchanged, the model output of the shared driving system in next $n_p$ steps can be expressed as:

$$y_{c(k+1|k)} = C_c A_{cd} x_{ck} + C_c B_{hd}\tau_k^h + C_c B_{md}\tau_k^m + C_c N_{cd} w_k'$$

$$\vdots$$

$$y_{c(k+n_u|k)} = C_c A_{cd}^{n_u} x_{ck} + C_c A_{cd}^{n_u-1} B_{hd}\tau_k^h + \dots + C_c B_{hd}\tau_{(k+n_u-1)}^h + C_c A_{cd}^{n_u-1} B_{md}\tau_k^m + \dots + C_c B_{md}\tau_{(k+n_u-1)}^h + \sum_{i=1}^{n_u} C_c A_{cd}^{i-1} N_{cd} w_k'$$

-continued $$\vdots$$

$$y_{c(k+n_p|k)} = C_{ccd}^{n_p} x_{ck} + C_c A_{cd}^{n_p-1} B_{hd}\tau_k^h + C_c A_{cd}^{n_p-2} B_{hd}\tau_{k+1}^h + \dots + \sum_{i=0}^{n_p-n_u} C_c A_d^i B_d \tau_{k+n_u-1}^h + C_c A_{cd}^{n_p-1} B_{md}\tau_{k+1}^m + C_c A_{cd}^{n_p-2} B_{md}\tau_{k+1}^m + \dots + \sum_{i=0}^{n_p-n_u} C_c A_d^i B_{md}\tau_{k+n_u-1}^m + \sum_{i=1}^{n_p} C_c A_{cd}^{i-1} N_{cd} w_k'$$

In step S802, a prediction output vector in the prediction time domain is determined based on the second discrete state update equation, as well as a reference trajectory vector of the driver and a reference trajectory vector of the driving system are determined.

It is assumed that the prediction time domain and the control time domain of the model prediction algorithm for the shared driving system are both $n_u$, then at time instant k, the model prediction output vector in the prediction time domain is defined as $Y_{pk}$, as shown in formula (8), and the human-machine control input vectors are respectively $U_{hk}$ and $U_{mk}$, as shown in formulas (9) and (10):

$$Y_{pk} = \begin{bmatrix} y_{c(k+1|k)} & y_{c(k+2|k)} & \dots & y_{c(k+n_p|k)} \end{bmatrix}^T \quad (8)$$

$$U_{hk} = \begin{bmatrix} \tau_k^h & \tau_{k+1}^h & \dots & \tau_{k+n_u-1}^h \end{bmatrix}^T \quad (9)$$

$$U_{mk} = \begin{bmatrix} \tau_k^m & \tau_{k+1}^m & \dots & \tau_{k+n_u-1}^m \end{bmatrix}^T \quad (10)$$

Based on the second discrete state update equation (formula 7), the model output of the shared driving system in next $n_p$ steps, which is the prediction output vector, can be expressed as formula (11):

$$Y_{pk} = \Psi x_{ck} + \Theta_h U_{hk} + \Theta_m U_{mk} + S w_k' \quad (11)$$

where $\Psi = \begin{bmatrix} C_c A_{cd} & C_c A_{cd}^2 & \dots & C_c A_{cd}^{n_u-1} \end{bmatrix}^T$, $$S = \left[ CN_{cd}\ CN_{cd} + CA_{cd}N_{cd} \dots \sum_{m=1}^{n_p} CA_{cd}^{m-1} N_{cd} \right]^T,$$

$$\Theta_h = \begin{bmatrix} C_c B_\omega & 0 & \dots & 0 & 0 \\ C_c A_{cd} B_{hd} & CB_{hd} & \dots & 0 & 0 \\ \vdots & \vdots & \ddots & CB_{hd} & 0 \\ CA_{cd}^{n_u-1} B_{hd} & CA_{cd}^{n_u-2} B_{hd} & \dots & CA_{cd} B_{hd} & CB_{hd} \end{bmatrix}, \text{and}$$

$$\Theta_m = \begin{bmatrix} C_c B_{md} & 0 & \dots & 0 & 0 \\ C_c A_{cd} B_{md} & CB_{md} & \dots & 0 & 0 \\ \vdots & \vdots & \ddots & CB_{md} & 0 \\ CA_{cd}^{n_u-1} B_{md} & CA_{cd}^{n_u-2} B_{md} & \dots & CA_{cd} B_{md} & CB_{md} \end{bmatrix}.$$

At each time step k, the reference trajectory vectors of the driver and the autonomous driving system can be expressed as formula (12):

$$R_{hk} = \begin{bmatrix} r_{h(k+1)}\ r_{h(k+2)} \dots\ r_{h(k+n_u)} \end{bmatrix}^T \quad (12)$$

$$R_{mk} = \begin{bmatrix} r_{m(k+1)}\ r_{m(k+2)} \dots\ r_{m(k+n_u)} \end{bmatrix}^T$$

In step S803, a driver trajectory cost function and a driving system trajectory cost function are respectively established based on the prediction output vector, the reference trajectory vector of the driver, and the reference trajectory vector of the driving system, to obtain the game model for human-machine path tracking control.

The parameters in the game model for human-machine path tracking control are represented by the prediction output vector $Y_{pk}$ and the reference trajectory vectors $R_{hk}$ and $R_{mk}$, and the driver trajectory cost function and the driving system trajectory cost function are obtained as shown in formula (13):

$$J_1 = \|\Gamma_{y1}[y_{pk} - R_{hk}]\|^2 + \|\Gamma_{u1} U_{hk}\|^2 \qquad (13)$$
$$J_2 = \|\Gamma_{y2}[y_{pk} - R_{mk}]\|^2 + \|\Gamma_{u2} U_{mk}\|^2$$

where $\Gamma_{yx}$ and $\Gamma_{ux}$ are both weighting matrices for the path tracking control, and $x \in \{1, 2\}$, $$\Gamma_{yx} = \mathrm{diag}\left(\sqrt{q_{yx}}, \sqrt{q_{\psi x}}, \ldots, \sqrt{q_{yx}}, \sqrt{q_{\psi x}}\right)_{2n_u \times 2n_u},$$
$$\Gamma_{ux} = \mathrm{diag}\left(\sqrt{q_{ux}}, \sqrt{q_{ux}}, \ldots, \sqrt{q_{ux}}\right)_{n_u \times n_u}.$$

In step S102, human-machine torque conflict information is obtained by solving the game model for human-machine path tracking control.

The game models for human-machine path tracking control are established separately in two (closed-loop and open-loop) different information modes in the step S101, and the solving of the two game models are also different.

In some embodiments, for the non-cooperative game problem, since the mirror symmetric anthropomorphic strategy is usually used in the shared driving system to design the controller of the autonomous driving system to improve the man-machine consistency, the driver and the autonomous driving system have an equal relationship in the game process. When the game participants are in the symmetric or equal relationship, the Nash Equilibrium provides a reasonable theoretical solution of the non-cooperative game. In such balanced state, no party plays a dominant role in the decision-making process, and neither party can reduce its own trajectory tracking cost function value by unilaterally adjusting its own decisions.

In addition, there is another type of non-cooperative game problem, namely the master-slave game problem of the dual-agent system, in which the leader understands the follower's reaction to its decision and makes the decision first, while the follower observes the leader's decision before making the corresponding decision. Such hierarchical game outcome is called Stackelberg Equilibrium.

Due to the fact that the Nash equilibrium and the Stackelberg equilibrium can theoretically model the decision control mechanism of the shared driving system, two solutions, namely the corresponding Nash equilibrium solution and the corresponding Stackelberg equilibrium solution can be obtained for each game model. Therefore, four quantitative models based on the non-cooperative game theory are planned to be used, and based on the open-loop information mode and the closed-loop information mode, the mapping relationship between human-machine decision divergence and steering torque conflict under the Nash equilibrium and the Stackelberg equilibrium will be analyzed in depth, in order to explore the optimal modeling method for the human-machine interaction mechanism.

1. Nash Equilibrium Solution of Human-Machine Decision-Making Control in Closed-Loop Information Mode In some embodiments of the present disclosure, the problem of solving Nash equilibrium in the closed-loop information mode can be described as the Hamiltonian function constrained optimization problem as shown in formula (14):

$$\min_{\tau_k^i \in \Gamma_k^i} H_k^i\left(\lambda_{k+1}^i, \tau_k^{m^*}, x_k^*\right) \qquad (14)$$

$$\text{s.t.}\begin{cases} x_{k+1} = f_k\left(x_k, \tau_k^h, \tau_k^m\right), x_0^* = x_0 \\ \lambda_k^i = \dfrac{\partial}{\partial x_k} f_k^T\left(x_k^*, \tau_k^{h^*}, \tau_k^{m^*}\right)\lambda_{k+1}^i + \left[\dfrac{\partial}{\partial x_k} g_k^i\left(x_k^*, \tau_k^{h^*}, \tau_k^{m^*}\right)\right]^T + \\ \dfrac{\partial}{\partial \tau_k^j} f_k^T\left(x_k^*, \tau_k^{h^*}, \tau_k^{m^*}\right)\lambda_{k+1}^i + \left[\dfrac{\partial}{\partial x_k} \tau_k^{j^*}(x_k^*, x_1)\right]^T + \\ \dfrac{\partial}{\partial \tau_k^j} \tau_k^{j^*}\left(x_k^*, \tau_k^{h^*}, \tau_k^{m^*}\right)\dfrac{\partial}{\partial x_k} \tau_k^{j^*} \tau_k^{j^*}(x_k^*, x_1) \end{cases}$$

where $$\lambda_k^i$$

is the covariant vector.

The closed form solution $$\left\{\tau_k^h = \tau_k^{h^*} \cdot (x_0, x_k), \tau_k^m = \tau_k^{m^*} \cdot (x_0, x_k)\right\}$$

of the above constrained optimization problem forms a closed-loop Nash equilibrium solution.

The Nash equilibrium solution in the open-loop mode is only related to the initial state and is independent of the current state in each stage. Therefore, the open-loop Nash equilibrium solution $$\left\{\tau_k^h = \tau_k^{h^*} \cdot (x_0), \tau_k^m = \tau_k^{m^*} \cdot (x_0)\right\}$$

also satisfies the closed-loop Nash equilibrium condition (14). However, it is clear that the solution of the closed-loop Nash equilibrium problem does not merely include the open-loop Nash equilibrium solution. This non-uniqueness of the information leads to the problem of multiple solutions in Nash equilibrium under closed-loop information structure. Due to the consideration of the parameter $\theta_k$ of the driver's stochastic steering torque in the system modeling herein, the non-uniqueness of the information in the game process is precisely eliminated. Therefore, the problem of multiple solutions can be avoided through the feedback Nash equilibrium, and the optimal solutions in each stage of the feedback Nash equilibrium satisfy the following conditions:

$$J_k^1\left(\tau_1^h, \ldots, \tau_{K-1}^h, \tau_K^{h^*}; \tau_1^m, \ldots, \tau_{K-1}^m, \tau_K^{m^*}\right) \le J_k^1\left(\tau^h; \tau_1^m, \ldots, \tau_{K-1}^m, \tau_K^{m^*}\right)$$
$$J_k^2\left(\tau_1^h, \ldots, \tau_{K-1}^h, \tau_K^{h^*}; \tau_1^m, \ldots, \tau_{K-1}^m, \tau_K^{m^*}\right) \le J_k^2\left(\tau_1^h, \ldots, \tau_{K-1}^h, \tau_K^{h^*}; \tau^m\right)$$
$$\vdots$$
$$J_{k-1}^1\left(\tau_1^h, \ldots, \tau_{K-2}^h, \tau_{K-1}^{h^*}; \tau_K^{h^*}; \tau_1^m, \ldots, \tau_{K-2}^m, \tau_{K-1}^{m^*}, \tau_K^{m^*}\right) \le J_{k-1}^1\left(\tau_1^h, \ldots,\right.$$

-continued $$\tau^{h}_{K-1}, \tau^{h^*}_{K}; \tau^{m}_{1}, \ldots, \tau^{m}_{K-2}, \tau^{m^*}_{K-1}, \tau^{m^*}_{K})$$

$$J^{2}_{k-1}(\tau^{h}_{1}, \ldots, \tau^{h}_{K-2}, \tau^{h^*}_{K-1}; \tau^{h^*}_{K}; \tau^{m}_{1}, \ldots, \tau^{m}_{K-2}, \tau^{m^*}_{K-1}, \tau^{m^*}_{K}) \leq J^{2}_{k-1}(\tau^{h}_{1}, \ldots, \tau^{h^*}_{K-1}, \tau^{h^*}_{K}; \tau^{m}_{1}, \ldots, \tau^{m}_{K-2}, \tau^{m^*}_{K-1}, \tau^{m^*}_{K})$$

$$J^{1}_{k-1}(\tau^{h^*}; \tau^{m^*}) \leq J^{1}_{k-1}(\tau^{h}_{1}, \tau^{h^*}_{2}, \ldots, \tau^{h^*}_{K}; \tau^{m^*})$$

$$J^{2}_{k-1}(\tau^{h^*}; \tau^{m^*}) \leq J^{2}_{k-1}(\tau^{h^*}; \tau^{m}_{1}, \tau^{m^*}_{2}, \ldots, \tau^{m^*}_{K})$$

It can be seen that the feedback Nash equilibrium under the closed-loop condition conforms to the Bellman Optimality Principle, and the closed-loop Nash equilibrium solution (also referred to as feedback Nash equilibrium solution) of the path tracking control system under the human-machine decision divergence condition can be solved through the Stochastic Dynamic Programming (SDP) algorithm.

Figure 9:
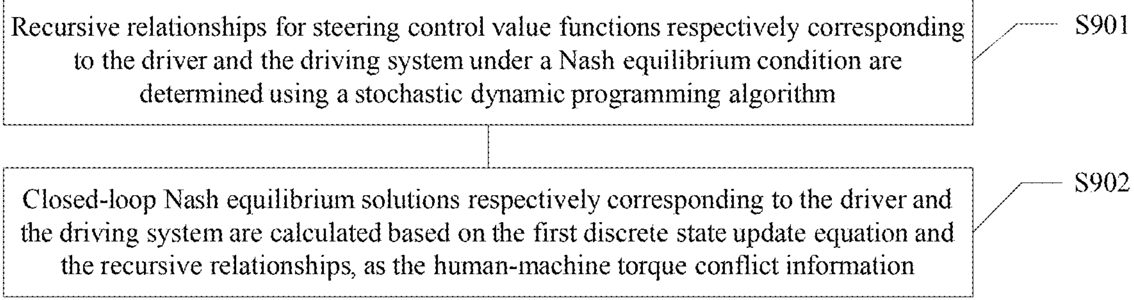
FIG. 9 shows a schematic flowchart of a method for solving a closed-loop game model for human-machine path tracking control according to one or more embodiments of the present disclosure.

FIG. 9 shows a schematic flowchart of a method for solving a closed-loop game model for human-machine path tracking control according to one or more embodiments of the present disclosure. As shown in FIG. 9, the method for solving the game model for human-machine path tracking control includes the following steps.

In step S901, recursive relationships for steering control value functions respectively corresponding to the driver and the driving system under a Nash equilibrium condition are determined using a stochastic dynamic programming algorithm.

In step S902, closed-loop Nash equilibrium solutions respectively corresponding to the driver and the driving system are calculated based on the first discrete state update equation and the recursive relationships, as the human-machine torque conflict information.

In some embodiments, at any time step k, it is assumed that the unmodeled interference $c_k$ of the shared driving system remains unchanged throughout the dynamic game of entire $n_u$ stages, and the Gaussian random distribution $\theta_k \sim N(\mu, \sigma)$ is used to describe the parameter related to the driver's stochastic steering torque, where μ and σ respectively represent the mean and the standard deviation of the Gaussian distribution.

Due to the presence of interference vectors $c_k$ and $\theta_k$, solving the human-machine game problem based on the steering torque interaction becomes an affine quadratic problem. Therefore, in the process of dynamic programming, the steering control value functions of the driver and the driving system have the following affine quadratic form as shown in formula (15):

$$V^{1}_{k+j} = \frac{1}{2}x^{T}_{k+j}Z^{1}_{k+j}x_{k+j} + \zeta^{1T}_{k+j}x_{k+j} + n^{1}_{k+j};\ V^{1}_{k+n_u} = \frac{1}{2}x^{T}_{k+n_u}Q_1x_{k+n_u} \tag{15}$$

$$V^{2}_{k+j} = \frac{1}{2}x^{T}_{k+j}Z^{2}_{k+j}x_{k+j} + \zeta^{2T}_{k+j}x + n^{2}_{k+j};\ V^{2}_{k+n_u} = \frac{1}{2}x^{T}_{k+n_u}Q_2x_{k+n_u}$$

The steering control value functions in the above formula (15) represent the values of the value functions of the driver and the driving system, in the game process of their respective cost functions from the $j^{th}$ stage to the $n_u^{th}$ stage, and the steering control value functions at the $(k+j)^{th}$ step and $(k+j+1)^{th}$ step satisfy the recursive relationships as shown in formula (16):

$$V^{1N}_{k+j} = \min_{\tau^{1}_{k+j} \in R} E_{\theta_{k+j}}\left[g_1(x_{k+j}, \tau^{h}_{k+j}, \tau^{mN}_{k+j}) + V^{1N}_{k+j+1}\right] \tag{16}$$

$$V^{2N}_{k+j} = \min_{\tau^{2}_{k+j} \in R} E_{\theta_{k+j}}\left[g_2(x_{k+j}, \tau^{hN}_{k+j}, \tau^{m}_{k+j}) + V^{2N}_{k+j+1}\right]$$

where the superscript "N" represents the value functions under the Nash equilibrium condition, and the single step cost functions g ( ) for each stage can be expressed as shown in formula (17):

$$g_1(x_{k+j}, \tau^{h}_{k+j}, \tau^{m}_{k+j}) = \frac{1}{2}(x^{T}_{k+j}Q_1x_{k+j} + \tau^{hT}_{k+j}R_{11}\tau^{h}_{k+j} + \tau^{mT}_{k+j}R_{12}\tau^{m}_{k+j}) \tag{17}$$

$$g_2(x_{k+j}, \tau^{h}_{k+j}, \tau^{m}_{k+j}) = \frac{1}{2}(x^{T}_{k+j}Q_1x_{k+j} + \tau^{hT}_{k+j}R_{11}\tau^{h}_{k+j} + \tau^{mT}_{k+j}R_{12}\tau^{m}_{k+j})$$

By substituting the first discrete state update equation $$x_{k+1} = Ax_k + B_1\tau^{h}_{k} + B_2\tau^{m}_{k} + c_k + \theta_k$$

(formula 4) into the steering control value functions (formula 15), the human-machine torque relationships satisfying the closed-loop Nash equilibrium relationship can be obtained as shown in formula (18):

$$R_{11}\tau^{hN}_{k+j} + B^{T}_{1}Z^{1}_{k+j+1}(Ax_{k+j} + B_1\tau^{hN}_{k+j} + B_2\tau^{M}_{k+j} + c_{k+j} + B_1\mu) + B^{T}_{1}\zeta^{1}_{k+j+1} = 0 \tag{18}$$

$$R_{22}\tau^{mN}_{k+j} + B^{T}_{2}Z^{2}_{k+j+1}(Ax_{k+j} + B_1\tau^{hN}_{k+j} + B_2\tau^{mN}_{k+j} + c_{k+j} + B_1\mu) + B^{T}_{2}\zeta^{2}_{k+j+1} = 0$$

Figure 10:
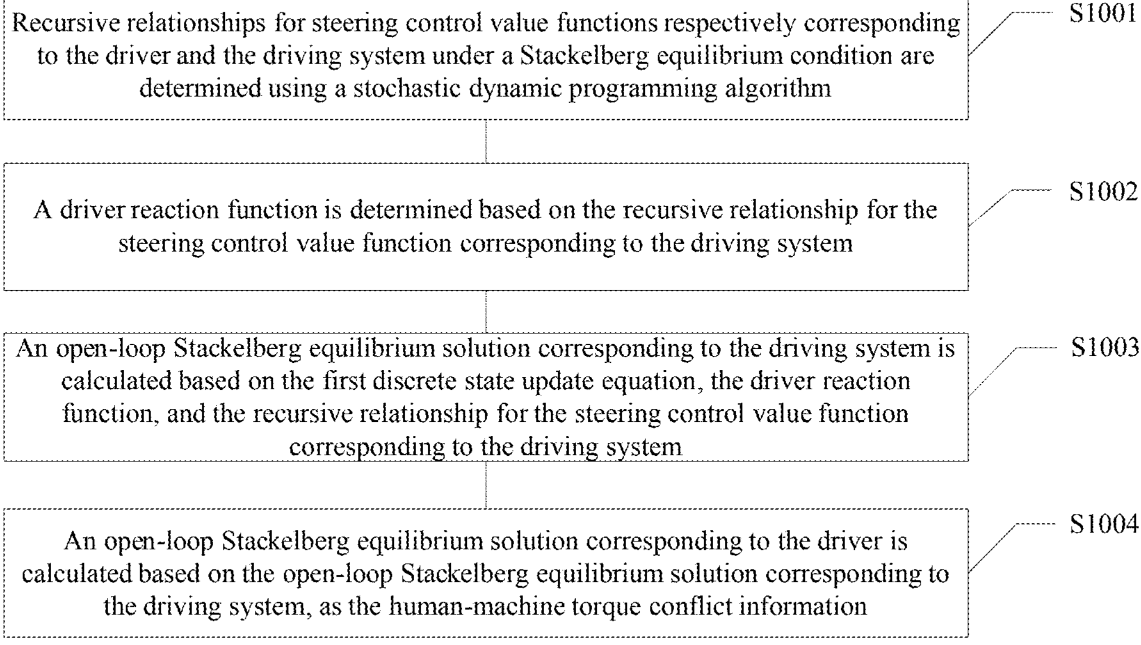
FIG. 10 shows a schematic flowchart of a method for solving a closed-loop game model for human-machine path tracking control according to one or more embodiments of the present disclosure.

2. Stackelberg Equilibrium Solution of Human-Machine Decision-Making Control in Closed-Loop Information Mode FIG. 10 shows a schematic flowchart of a method for solving a closed-loop game model for human-machine path tracking control according to one or more embodiments of the present disclosure. As shown in FIG. 10, the method for solving the game model for human-machine path tracking control includes the following steps.

In step S1001, recursive relationships for steering control value functions respectively corresponding to the driver and the driving system under a Stackelberg equilibrium condition are determined using a stochastic dynamic programming algorithm.

In step S1002, a driver reaction function is determined based on the recursive relationship for the steering control value function corresponding to the driving system.

In step S1003, an open-loop Stackelberg equilibrium solution corresponding to the driving system is calculated based on the first discrete state update equation, the driver reaction function, and the recursive relationship for the steering control value function corresponding to the driving system.

In step S1004, an open-loop Stackelberg equilibrium solution corresponding to the driver is calculated based on the open-loop Stackelberg equilibrium solution corresponding to the driving system, as the human-machine torque conflict information.

In some embodiments, different from the Nash equilibrium, in the Stackelberg equilibrium, there is a master-slave relationship between the driver and the autonomous driving system. At each stage of the game, the driving system, as the dominant party, first inputs the steering control input, and the driver observes this action and reacts accordingly.

Therefore, the closed-loop Stackelberg equilibrium solution can be solved through backward induction. Based on the stochastic dynamic programming method, the recursive relationships for the steering control value function corresponding to the driver are the same, that is, $$V_{k+j}^{1S} \text{ and } V_{k+j}^{1N}$$

(see formula 16) are the same.

The recursive relationship for the steering control value function corresponding to the driving system in the closed-loop Stackelberg equilibrium solution (also referred to as feedback Stackelberg equilibrium solution) in the closed-loop information mode satisfies the condition shown in formula (19):

$$V_{k+j}^{2S} = \min_{\tau_{k+j}^{hs} \in \Gamma^h(\tau^m), \tau_{k+j}^m \in R} E_{\theta_{k+j}}\left[g_2\left(x_{k+j}, \tau_{k+j}^{hS}, \tau_{k+j}^m\right) + V_{k+j+1}^{2S}\right] \tag{19}$$

where the superscript "S" represents the value function under the Stackelberg equilibrium condition, and $$\Gamma^h = \left\{\tau_{k+j}^h(\tau_m) \mid V_{k+j}^{1S} = \min_{\tau_{k+j}^h \in R} E_{\theta_{k+j}}\left[g_2\left(x_{k+j}, \tau_{k+j}^h, \tau_{k+j}^m\right) + V_{k+j+1}^{1S}\right]\right\}.$$

By substituting the first discrete state update equation $$x_{k+1} = Ax_k + B_1\tau_k^h + B_2\tau_k^m + c_k + \theta_k$$

(formula 4) and the recursive relationship $$V_{k+j}^{1S}$$

for the steering control value function corresponding to the driver into the recursive relationship for the steering control value function corresponding to the driving system (formula 19), the driver reaction function on the steering torque of the driving system can be calculated, as shown in formula (20):

$$\tau_{k+j}^{hS} = -\left(R_{11} + B_1^T Z_{k+j+1}^1 B_1\right)^{-1} B_1^T\left[Z_{k+j+1}^1\left(B_2^T\tau_{k+j}^m + Ax_{k+j} + c_{k+j} + B_2\mu\right) + \zeta_{k+j+1}^1\right] \tag{20}$$

By substituting the first discrete state update equation (formula 4) and the driver reaction function (formula 20) into the recursive relationship for the steering control value function corresponding to the driving system (formula 19), the open-loop Stackelberg equilibrium solution of the driving system under the Stackelberg equilibrium strategy is as shown in formula (21):

$$\begin{aligned} &A_L\tau_{k+j}^{mS} + \left[A_{S4}Z_{k+j+1}^1 + A_{S3}^T Z_{k+j+1}^2\left(I - B_1A_{S2}Z_{k+j+1}^1\right)\right]Ax_{k+j} + \\ &\left(A_{S4}Z_{k+j+1}^1 - A_{S3}^T Z_{k+j+1}^2 B_1 A_{S2} Z_{k+j+1}^1 + A_{S3}^T Z_{k+j+1}^2\right) \times (c_k + B_2\mu) + \\ &\qquad A_{S3}^T\zeta_{k+j+1}^2 + \left(A_{S4} - A_{S3}^T Z_{k+j+1}^2 B_1 A_{S2}\right)\zeta_{k+j+1}^1 = 0 \end{aligned} \tag{21}$$

where $A_{S2} = \left(R_{11} + B_1^T Z_{k+j+1}^1 B_1\right)^{-1} B_1^T$, $A_{S3} = B_2 - B_1 A_{S2} Z_{k+j+1}^1 B_2$, $A_{S4} = B_2^T Z_{k+j+1}^1 A_{S2}^T R_{21} A_{S2}$, $A_L = R_{22} + A_{S4} Z_{k+j+1}^1 B_2 + A_{S3}^T Z_{k+j+1}^2 A_{S3}$.

Since the driving system is the dominant party and the driver is the follower party, the open-loop Stackelberg equilibrium solution of the driving system can be used to obtain the corresponding Hamiltonian function constrained optimization problem for the driver, and the closed form solution can be obtained as the open-loop Stackelberg equilibrium solution of the driver.

Figure 11:
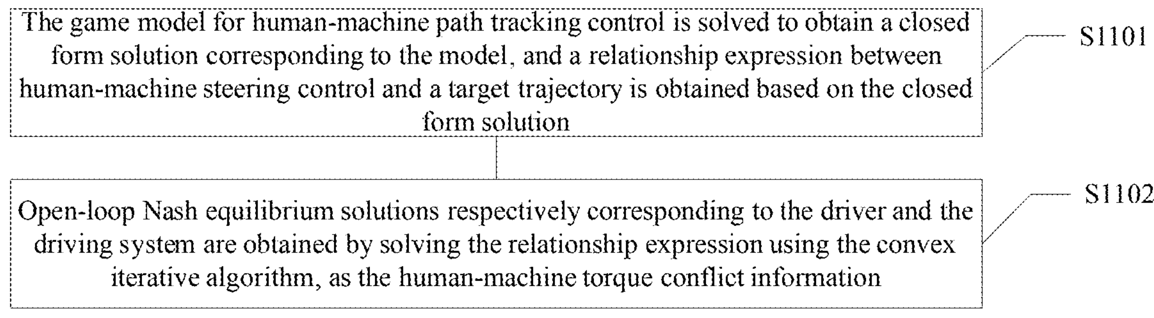
FIG. 11 shows a schematic flowchart of a method for solving an open-loop game model for human-machine path tracking control according to one or more embodiments of the present disclosure.

3. Nash Equilibrium Solution of Human-Machine Decision-Making Control in Open-Loop Information Mode FIG. 11 shows a schematic flowchart of a method for solving an open-loop game model for human-machine path tracking control according to one or more embodiments of the present disclosure. As shown in FIG. 11, the method for solving the game model for human-machine path tracking control includes the following steps.

In step S1101, the game model for human-machine path tracking control is solved to obtain a closed form solution corresponding to the model, and a relationship expression between human-machine steering control and a target trajectory is obtained based on the closed form solution.

In step S1102, open-loop Nash equilibrium solutions respectively corresponding to the driver and the driving system are obtained by solving the relationship expression using the convex iterative algorithm, as the human-machine torque conflict information.

In some embodiments, based on the definition of the open-loop Nash equilibrium, the convex iterative algorithm is used to solve the Nash equilibrium solution of the system in the open-loop information mode.

For the unconstrained problem as shown in formula (13), the human-machine path tracking control law has the following closed form solutions, as shown in formula (22):

$$\begin{aligned} U_{hk}^* &= \underset{U_{hk}}{\operatorname{argmin}} J_1 = L_h(R_{hk} - \Psi x_{ck} - \Theta_m U_{mk} - Sw_k') \\ U_{mk}^* &= \underset{U_{mk}}{\operatorname{argmin}} J_2 = L_m(R_{mk} - \Psi x_{ck} - \Theta_h U_{hk} - Sw_k') \end{aligned} \tag{22}$$

where $L_h = pinv\left(\begin{bmatrix}\Gamma_{y1}\Theta_h \\ \Gamma_{u1}\end{bmatrix}\right)\begin{bmatrix}\Gamma_{y1} \\ 0\end{bmatrix}$, $L_m = pinv\left(\begin{bmatrix}\Gamma_{y2}\Theta_h \\ \Gamma_{u2}\end{bmatrix}\right)\begin{bmatrix}\Gamma_{y2} \\ 0\end{bmatrix}$.

Herein, the pinv( ) is the pseudo inverse operator, $pinv(A)=(A^TA)^{-1}A^T$, and thus the relationship expression between the human-machine steering control and the target trajectory can be obtained, as shown in formula (23):

$$\begin{bmatrix}U_{hk}^* \\ U_{mk}^*\end{bmatrix} = \begin{bmatrix}L_h & 0 \\ 0 & L_m\end{bmatrix}\begin{bmatrix}R_{hk} - \Psi x_{ck} - \Theta_m U_{mk} - Sw_k' \\ R_{mk} - \Psi x_{ck} - \Theta_h U_{hk} - Sw_k'\end{bmatrix} + \begin{bmatrix}0 & -L_h\Theta_m \\ -L_m\Theta_h & 0\end{bmatrix}\begin{bmatrix}U_{hk} \\ U_{hk}\end{bmatrix} \tag{23}$$

From formula (23), it can be seen that there is an interactive coupling relationship between the control laws of the two. That is, their own control actions are not only related to their respective decision objectives, system states, and interferences, but also closely related to each other's control strategies. Therefore, in order to decouple formula (23), the convex iterative algorithm is used to solve it, and an update equation is obtained as shown in formula (24):

$$U_{hk(i+1)} = w_1 U^*_{hk(i)} + (1 - w_1)U_{hk(i)} \quad (24)$$
$$U_{mk(i+1)} = w_1 U^*_{mk(i)} + (1 - w_1)U_{mk(i)}$$

The solving process based on the convex iterative algorithm can be summarized as follows: the initial values $U_{hk(0)}$ and $U_{mk(0)}$ for iteration are first determined, which are then substituted into the relationship expression (formula 23) to obtain the current optimal values $$U^*_{hk(0)} \text{ and } U^*_{mk(0)},$$

and again substituted into the update equation (formula 24), to update $U_{hk(1)}$ and $U_{mk(1)}$ for the next step. The above iterative cycle continues as such. When i approaches infinity, the update equation (formula 24) is transformed into:

$$U_{hk(\infty)} = w_1 U^*_{hk(\infty)} + (1 - w_1)U_{hk(\infty)} \quad (25)$$
$$U_{mk(\infty)} = w_1 U^*_{mk(\infty)} + (1 - w_1)U_{mk(\infty)}$$

Thus, the relationship expression (formula 23) is transformed into:

$$\begin{bmatrix} U_{hk(\infty)} \\ U_{mk(\infty)} \end{bmatrix} = \begin{bmatrix} L_h & 0 \\ 0 & L_m \end{bmatrix} \begin{bmatrix} R_{hk} - \Psi x_{ck} - \Theta_m U_{mk} - Sw'_k \\ R_{mk} - \Psi x_{ck} - \Theta_h U_{hk} - Sw'_k \end{bmatrix} + \begin{bmatrix} 0 & -L_h\Theta_m \\ -L_m\Theta_h & 0 \end{bmatrix} \begin{bmatrix} U_{hk(\infty)} \\ U_{mk(\infty)} \end{bmatrix} \quad (26)$$

The equation for the Nash equilibrium solution of the human-machine decision control in the open-loop information mode is as shown in formula (27):

$$\begin{bmatrix} U^{ON}_{hk} \\ U^{ON}_{mk} \end{bmatrix} = \begin{bmatrix} I & L_1\Theta_m \\ L_2\Theta_h & I \end{bmatrix}^{-1} \begin{bmatrix} L_h & 0 \\ 0 & L_m \end{bmatrix} \begin{bmatrix} R_{hk} - \Psi x_{ck} - Sw'_k \\ R_{mk} - \Psi x_{ck} - Sw'_k \end{bmatrix} \quad (27)$$

In the actual modeling process, the value of the first stage of the game is taken as the human-machine interaction result of the open-loop Nash equilibrium at time instant k, that is, the human-machine torque conflict information:

$$\tau^{hON}_k = [1 \ 0 \ \dots \ 0]_{1\times n_u} U^{ON}_{hk} \quad (28)$$
$$\tau^{mON}_k = [1 \ 0 \ \dots \ 0]_{1\times n_u} U^{ON}_{mk}$$

Figure 12:
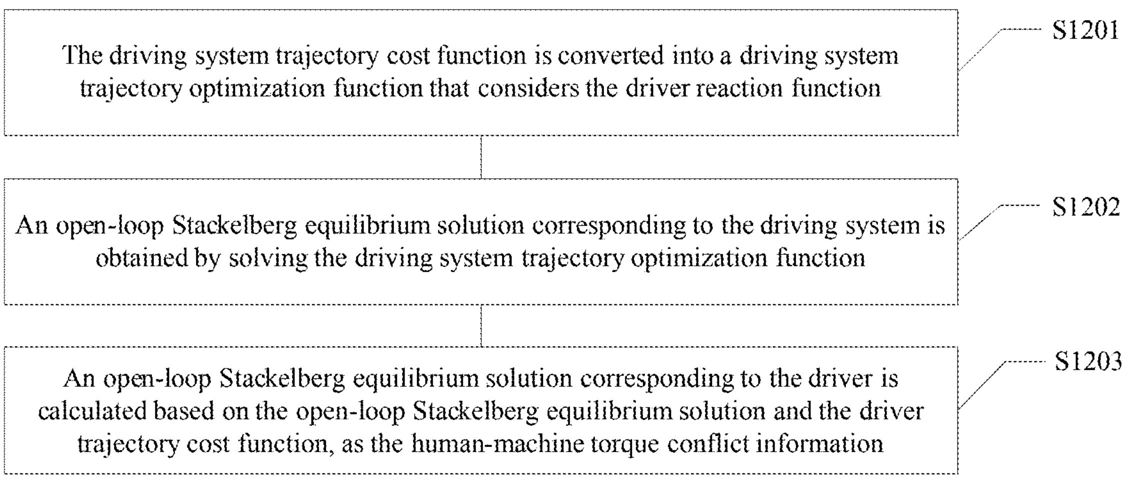
FIG. 12 shows a schematic flowchart of a method for solving an open-loop game model for human-machine path tracking control according to one or more embodiments of the present disclosure.

4. Stackelberg Equilibrium Solution of Human-Machine Decision-Making Control in Open-Loop Information Mode FIG. 12 shows a schematic flowchart of a method for solving an open-loop game model for human-machine path tracking control according to one or more embodiments of the present disclosure. As shown in FIG. 12 the method for solving the game model for human-machine path tracking control includes the following steps.

In step S1201, the driving system trajectory cost function is converted into a driving system trajectory optimization function that considers the driver reaction function.

In step S1202, an open-loop Stackelberg equilibrium solution corresponding to the driving system is obtained by solving the driving system trajectory optimization function.

In step S1203, an open-loop Stackelberg equilibrium solution corresponding to the driver is calculated based on the open-loop Stackelberg equilibrium solution and the driver trajectory cost function, as the human-machine torque conflict information.

In some embodiments, the backward induction can also be used for obtaining the open-loop Stackelberg equilibrium solution, which is similar to that for the closed-loop Stackelberg equilibrium solution. Substituting the predicted output vector $Y_{pk}$ (formula 11) into the game model (formula 13) yields:

$$J_1 = \|\Gamma_{y1}[\Theta_h U_{hk} - E_{hk}]\|^2 + \|\Gamma_{u1} U_{hk}\|^2 \quad (29)$$
$$J_2 = \|\Gamma_{y2}[\Theta_m U_{mk} - E_{mk}]\|^2 + \|\Gamma_{u2} U_{mk}\|^2$$
$$\text{where } E_{hk} = R_{hk} - \Psi x_{ck} - S_d w'_k - \Theta_m U_{mk},$$
$$E_{mk} = R_{mk} - \Psi x_{ck} - S_d w'_k - \Theta_h U_{hk}.$$

Different from the open-loop Nash equilibrium solution, in the master-slave game, the autonomous driving system, as the dominant party, takes actions first at each stage of the game, and the driver reacts accordingly after observing the action of the autonomous driving system.

Therefore, by solving $J_1$, the driver reaction function to the driving system can be obtained, as shown in formula (30):

$$U^*_{hk} = pinv\left(\begin{bmatrix} \Gamma_{y1}\Theta_h \\ \Gamma_{u1} \end{bmatrix}\right)\begin{bmatrix} \Gamma_{y1} \\ 0 \end{bmatrix}(R_{hk} - \Psi x_{ck} - S_d w'_k - \Theta_h U_{hk}) = L_h E_{hk} \quad (30)$$

When a control strategy is adopted, the driving system considers the driver reaction function into its cost function, to obtain a new driving system trajectory cost function, as shown in formula (31):

$$J_2 = \|\Gamma_{y2}[\Theta_m U_{mk} - R_{mk} + \Psi x_{ck} + S_d w'_k + \Theta_h L_{hk} E_{hk}]\|^2 + \|\Gamma_{u2} U_{mk}\|^2 \quad (31)$$

Therefore, solving the Stackelberg equilibrium solution of the steering torque control of the driving system in the open-loop information mode is transformed into solving the unconstrained optimization problem as shown in formula (32):

$$\min_{U_{hk}\in\Gamma^h(U_{mk}), U_{mk}\in R^{n_u}} \left\| \begin{matrix} \Gamma_{y2}[\Theta_m U_{mk} - R_{mk} + \Psi x_{ck} + S_d w'_k + \Theta_h L_{hk} E_{hk}] \\ \Gamma_{u2} U_{mk} \end{matrix} \right\|^2 \quad (32)$$

By solving the above optimization problem, the open-loop Stackelberg equilibrium solution corresponding to the driving system can be obtained as shown in formula (33):

$$U_{mk}^{OS} = L'_m(-\Theta'_m R_{hk} + R_{mk} - \Psi'_m x_{ck} - S'_m w'_k) \tag{33}$$

where $\Psi'_m = \Psi - \Theta_h L_{hk} \Psi$, $S'_m = S - \Theta_h L_h S_d$, $\Theta'_m = \Theta_h L_h$, $\Theta'_{m1} = \Theta_m - \Theta_h L_h \Theta_m$, $$L'_m = pinv\left(\begin{bmatrix} \Gamma_{y2}\Theta'_{m1} \\ \Gamma_{u2} \end{bmatrix}\right).$$

Based on the Stackberg equilibrium solution $$U_{mk}^{OS}$$

of the steering control of the driving system, the optimal reaction of the driver to the steering control of the autonomous driving system can be obtained by solving the optimization problem such as formula (34):

$$\min_{U_{hk} \in \Gamma^1(U_{mk})} \left\| \begin{matrix} \Gamma_{y1}\left[\Theta_h U_{hk} - R_{hk} + \Psi x_{ck} + S_d w'_k + \Theta_m U_{mk}^{OS}\right] \\ \Gamma_{u1} U_{hk} \end{matrix} \right\|^2 \tag{34}$$

The Stackelberg equilibrium solution of the steering control of the driver in open-loop information mode can be obtained from the above equation, as shown in formula (35):

$$U_{hk}^{OS} = L_h(T'_1 R_{hk} + \Theta'_h R_{mk} + \Psi'_1 x_{ck} + S'_1 w'_k) \tag{35}$$

where $T'_1 = I + \Theta_m L'_m \Theta'_m$, $\Theta'_h = \Theta_m L'_m$, $\Psi'_1 = -\Psi + \Theta_m L'_m \Psi'_m$, $S'_1 = -S + \Theta_m L'_m S'_m$, $$L_h = pinv\left(\begin{bmatrix} \Gamma_{y1}\Theta_h \\ \Gamma_{u1} \end{bmatrix}\right).$$

Similarly, the open-loop Stackelberg equilibrium solution of the first stage of the game is taken to describe the interaction result of human-machine steering torque at time k, as shown in formula (36):

$$\hat{\tau}_k^{hON} = [1 \ 0 \ \ldots \ 0]_{1 \times n_u} U_{hk}^{OS} \tag{36}$$

$$\hat{\tau}_k^{mON} = [1 \ 0 \ \ldots \ 0]_{1 \times n_u} U_{mk}^{OS}$$

Different from the open-loop Nash equilibrium, since the open-loop Stackelberg equilibrium is solved based on the backward induction method, when solving the autonomous driving system control law (formula 34), constraints can also be added, so that the autonomous driving system control law is transformed into a constrained optimization problem, and so that the controller can meet the expected performance. The significance of the open-loop Stackelberg equilibrium strategy provided in the present disclosure is not only to propose a theoretical model for the human-machine steering torque interaction, but also to flexibly design an interactive steering assistant controller that meets the kinematics and dynamics safety constraints by using this algorithm.

In step 103, a shared control strategy is determined based on the human-machine torque conflict information, and a vehicle is controlled based on the shared control strategy.

In some embodiments, the human-machine torque conflict information obtained in step 102 forms a theoretical basis for the relationship between the human-machine decision divergence and the control conflict. Based on this theoretical basis, a better shared control strategy can be designed for emergency lane changing conditions to guide the vehicle control.

In order to form the theoretical relationship between the human-machine decision divergence and the control conflict, the present disclosure models the mapping relationship between the human-machine decision divergence and the human-machine steering torque interaction based on four dynamic non-cooperative game theory frameworks.

On the one hand, the dynamics model for the shared driving system is augmented by the human-machine target trajectory, and then the human-machine interaction action in the feedback information mode is modeled using the linear quadratic regulator method.

Since the model establishes the mapping relationship between the human-machine decision divergence and the steering torque interaction, the existence of the steering resistance torque and the uncertainty torque from the driver makes the solving of the human-machine decision divergence problem become the affine quadratic game problem. Therefore, according to the affine quadratic game algorithm based on the stochastic dynamic programming provided by the present disclosure, the feedback Nash equilibrium solution and the feedback Stackelberg equilibrium solution that describe the interaction relationship between the human-machine decision and the steering torque can be obtained.

On the other hand, the distributed model predictive control method is used to describe the multi-objective path tracking control problem between humans and vehicles under the open-loop condition. In order to solve the human-machine decision control model in the open-loop information mode, the model predictive control method is further used to solve the open-loop Nash equilibrium solution and the open-loop Stackelberg equilibrium solution that describe the mapping relationship between the human-machine decision and control.

Figure 13:
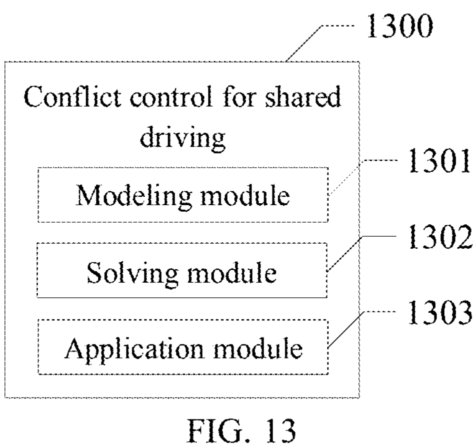
FIG. 13 shows a schematic diagram of a structure of a conflict control apparatus for shared driving according to one or more embodiments of the present disclosure.

FIG. 13 shows a schematic diagram of a structure of a conflict control apparatus for shared driving according to one or more embodiments of the present disclosure. As shown in FIG. 13, the conflict control apparatus 1300 for shared driving can include a modeling module 1301, a solving module 1302, and an application module 1303.

The modeling module 1301 is configured to establish, based on a driver's deterministic steering torque and a driver's stochastic steering torque, a game model for human-machine path tracking control corresponding to a human-machine interaction action.

The solving module 1302 is configured obtain human-machine torque conflict information by solving the game model for human-machine path tracking control.

The application module 1303 is configured to determine a shared control strategy based on the human-machine torque conflict information, and control a vehicle based on the shared control strategy.

According to one or more embodiments of the present disclosure, the modeling module 1301 includes a first modeling unit. The first modeling unit is configured to establish, based on the driver's deterministic steering torque and the driver's stochastic steering torque, a first discrete state update equation for a dynamics system of a shared driving vehicle in a closed-loop information mode; obtain a path tracking augmentation system that includes a human-machine preview state by augmenting the first discrete state update equation through a human-machine preview dynamic process; and establish, based on the path tracking augmentation system, a driver trajectory cost function and a driving system trajectory cost function, to obtain the game model for human-machine path tracking control.

According to one or more embodiments of the present disclosure, the modeling module 1301 includes a second modeling unit. The second modeling unit is configured to establish, based on the driver's deterministic steering torque and the driver's stochastic steering torque, a second discrete state update equation for a dynamics system of a shared driving vehicle in an open-loop information mode; determine a prediction output vector in a prediction time domain based on the second discrete state update equation; determine a driver reference trajectory vector and a driving system reference trajectory vector; and establish, based on the prediction output vector, the driver reference trajectory vector, and the driving system reference trajectory vector, a driver trajectory cost function and a driving system trajectory cost function, to obtain the game model for human-machine path tracking control.

According to one or more embodiments of the present disclosure, the solving module 1302 includes a first solving unit. The first solving unit is configured to determine, based on a stochastic dynamic programming algorithm, recursive relationships for steering control value functions respectively corresponding to a driver and a driving system under a Nash equilibrium condition; and calculate, based on the first discrete state update equation and the recursive relationships, closed-loop Nash equilibrium solutions respectively corresponding to the driver and the driving system, as the human-machine torque conflict information.

According to one or more embodiments of the present disclosure, the solving module 1302 includes a second solving unit. The second solving unit is configured to determine, based on a stochastic dynamic programming algorithm, recursive relationships for steering control value functions respectively corresponding to a driver and a driving system under a Stackelberg equilibrium condition; determine a driver reaction function based on the recursive relationship for the steering control value function corresponding to the driving system; calculate, based on the first discrete state update equation, the driver reaction function, and the recursive relationship for the steering control value function corresponding to the driving system, an open-loop Stackelberg equilibrium solution corresponding to the driving system; and calculate, based on the open-loop Stackelberg equilibrium solution corresponding to the driving system, an open-loop Stackelberg equilibrium solution corresponding to the driver, as the human-machine torque conflict information.

According to one or more embodiments of the present disclosure, the solving module 1302 includes a third solving unit. The third solving unit is configured to obtain a closed form solution corresponding to the game model by solving the game model for human-machine path tracking control; obtain, based on the closed form solution corresponding to the game model, a relationship expression between human-machine steering control and a target trajectory; and obtain open-loop Nash equilibrium solutions respectively corresponding to a driver and a driving system by solving the relationship expression based on a convex iterative algorithm, as the human-machine torque conflict information.

According to one or more embodiments of the present disclosure, the solving module 1302 includes a fourth solving unit. The fourth solving unit is configured to convert the driving system trajectory cost function into a driving system trajectory optimization function that considers a driver reaction function; obtain an open-loop Stackelberg equilibrium solution corresponding to a driving system by solving the driving system trajectory optimization function; and calculate, based on the open-loop Stackelberg equilibrium solution and the driver trajectory cost function, an open-loop Stackelberg equilibrium solution corresponding to a driver, as the human-machine torque conflict information.

The specific details of each module in the above conflict control apparatus 1300 for shared driving have been described in detail in the corresponding conflict control methods for shared driving, which will not be repeated here.

It should be noted that although several modules or units of the apparatus used for perform actions are mentioned in the above in detail, the present disclosure is not mandatory. According to the embodiments of the present disclosure, the features and functions of two or more modules or units described in the above can be embodied in one module or unit. On the contrary, the features and functions of one module or unit described in the above can be further divided into and embodied in multiple modules or units.

Figure 14:
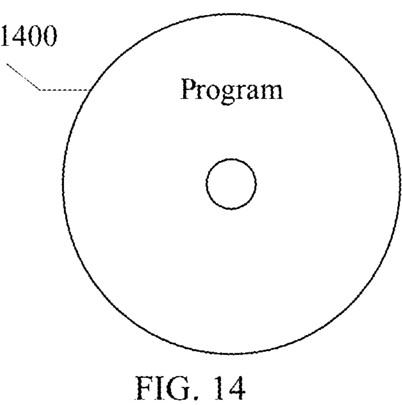
FIG. 14 shows a schematic diagram of a computer-readable storage medium according to one or more embodiments of the present disclosure.

In one or more embodiments of the present disclosure, a storage medium capable of implementing the above method is also provided. FIG. 14 shows a schematic diagram of a computer-readable storage medium according to one or more embodiments of the present disclosure. As shown in FIG. 14, a program product 1400 for implementing the above methods according to one or more embodiments of the present disclosure is described, which can be a portable compact disc read-only memory (CD-ROM) and include program codes. The program product can run on terminal devices such as mobile phones. However, the program product provided in the present disclosure is not limited to this. In the present disclosure, the readable storage medium can be any tangible medium containing or storing programs that can be used by an instruction execution system, an apparatus, or a device, or used in combination with it.

Figure 15:
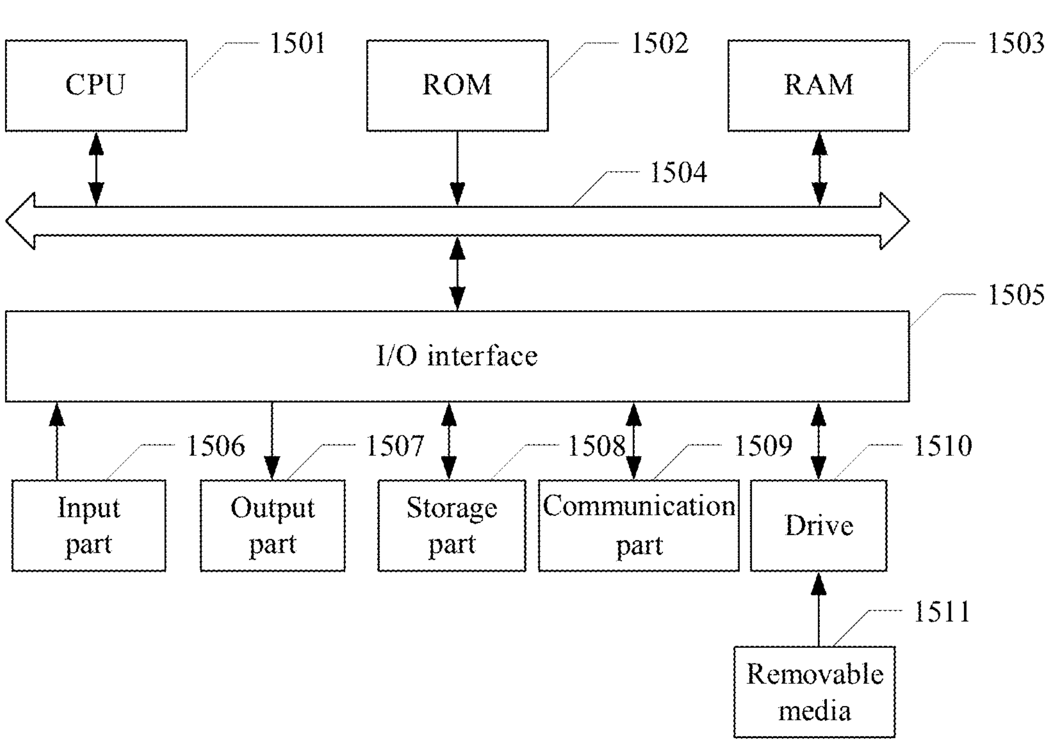
FIG. 15 shows a schematic diagram of a structure of a computer system in an electronic device according to one or more embodiments of the present disclosure.

In one or more embodiments of the present disclosure, an electronic device capable of implementing the above method is also provided. FIG. 15 shows a schematic diagram of a structure of a computer system in an electronic device according to one or more embodiments of the present disclosure.

It should be noted that the computer system 1500 of the electronic device shown in FIG. 15 is only an example and should not impose any restrictions on the functions and use scope of embodiments of the present disclosure.

As shown in FIG. 15, the computer system 1500 includes a central processing unit (CPU) 1501, which can perform various appropriate actions and processes according to a program stored in a read-only memory (ROM) 1502 or a program loaded from a storage part 1508 into a random access memory (RAM) 1503. RAM 1503 also stores various programs and data required for system operation. CPU 1501, ROM 1502 and RAM 1503 are connected to each other through bus 1504. An input/output (I/O) interface 1505 is also connected to bus 1504.

The following components are connected to the I/O interface 1505: an input part 1506 including such as keyboard, mouse; an output part 1507 including such as a cathode ray tube (CRT), a liquid crystal display (LCD), and a loudspeaker; a storage part 1508 including such as a hard disk; and a communication part 1509 including a network interface card such as a LAN card, a modem, and the like. The communication part 1509 performs communication processing via a network such as the Internet. A drive 1510 is also connected to the I/O interface 1505 as required. A removable media 1511, such as magnetic disks, optical disks, magneto-optical disks, and semiconductor memories, are installed on the drive 1510 as required, so that computer programs read from the drive 1510 can be installed into the storage part 1508 as required.

According to embodiments of the present disclosure, the process described below with reference to a flowchart can be implemented as a computer software program. For example, embodiments of the present disclosure include a computer program product, which includes a computer program carried on a computer-readable medium, and the computer program includes program codes for executing a method shown in a flowchart. In such embodiments, the computer program can be downloaded and installed from the network through the communication part 1509, and/or installed from the removable media 1511. When the computer program is executed by the central processing unit (CPU) 1501, various functions defined in systems of the present disclosure are executed.

It should be noted that the computer-readable medium shown in the present disclosure can be a computer-readable signal medium, a computer-readable storage medium, or any combination of the two. The computer-readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above. In the present disclosure, a computer-readable storage medium may be any tangible medium containing or storing a program, which may be used by or in combination with an instruction execution system, apparatus, or device. In the present disclosure, a computer-readable signal medium may include data signals transmitted in baseband or as part of a carrier wave, in which computer-readable program code is carried. Such transmitted data signals may take various forms, including but not limited to electromagnetic signals, optical signals or any suitable combination of the above. A computer-readable signal medium may also be any computer-readable medium other than a computer-readable storage medium, which may send, propagate, or transmit programs for use by or in combination with an instruction execution system, apparatus, or device. The program code contained in the computer readable medium can be transmitted in any suitable medium, including but not limited to wireless, wired, optical cable, RF, etc., or any suitable combination of the above.

The flowchart and block diagram in the accompanying drawings illustrate possible architectures, functions and operations of the systems, methods and computer program products according to various embodiments of the present disclosure. In this regard, each block in a flowchart or block diagram may represent a module, program segment, or part of a code that contains one or more executable instructions for implementing a specified logical function. It should also be noted that in some alternative implementations, the functions marked in the block may also occur in a different order from those marked in the drawings. For example, two consecutive boxes can actually be executed basically in parallel, or they can sometimes be executed in reverse order, depending on the function involved. It should also be noted that each block in the block diagram or flow chart, and the combination of the blocks in the block diagram or flow chart, can be implemented with a dedicated hardware based system that performs a specified function or operation, or can be implemented with a combination of dedicated hardware and computer instructions.

The units described in embodiments of the present disclosure can be implemented through software or hardware, and the units described can also be arranged in the processor. The names of these units do not constitute a limitation on the unit itself in some cases.

On the other hand, the present disclosure also provides a computer-readable medium, which can be included in the electronic devices described in the above embodiments. It can also exist independently without being assembled into the electronic device. The computer-readable medium carries one or more programs, and when the one or more programs are executed by one electronic device, the electronic device realizes the methods described in the above embodiments.

It should be noted that although several modules or units of the apparatus used for perform actions are mentioned in the above in detail, the present disclosure is not mandatory. According to the embodiments of the present disclosure, the features and functions of two or more modules or units described in the above can be embodied in one module or unit. On the contrary, the features and functions of one module or unit described in the above can be further divided into and embodied in multiple modules or units.

Based on the description of the above embodiments of the present disclosure, it is easy for those skilled in the art to understand that embodiments of the present disclosure can be implemented through software or by combining software with necessary hardware. Therefore, the technical solutions in embodiments of the present disclosure can be embodied in the form of a software product, which can be stored on a non-transitory storage medium (such as CD-ROM, USB flash drive, portable hard drive, etc.), or on a network. The software product includes several instructions to cause a computing device (such as a personal computer, a server, a touch terminal, or a network device) to implement the method according to the embodiments of the present disclosure.

After considering the specification and practicing the invention disclosed herein, those skilled in the art will easily think of other embodiments of the disclosure. The application is intended to cover any variant, use or adaptive change of the disclosure, which follows the general principles of the disclosure and includes the common general knowledge or frequently used technical means in the technical field not disclosed in the present disclosure.

It should be understood that the present disclosure is not limited to the precise structure already described above and shown in the drawings, and various modifications and changes can be made without departing from its scope. The scope of this disclosure is limited only by the appended claims.

What is claimed is:

1. A conflict control method for shared driving, performed by a shared driving system, the method comprising:

establishing, based on a driver's deterministic steering torque and a driver's stochastic steering torque, a game model for human-machine path tracking control corresponding to a human-machine interaction action;

obtaining human-machine torque conflict information by solving the game model for human-machine path tracking control;

determining a shared control strategy based on the human-machine torque conflict information; and controlling a shared driving vehicle based on the shared control strategy;

wherein the game model for human-machine path tracking control comprises an open-loop game model, and establishing the game model for human-machine path tracking control corresponding to the human-machine interaction action, comprises:

establishing, based on the driver's deterministic steering torque and the driver's stochastic steering torque, a first discrete state update equation for a dynamics system of the shared driving vehicle in an open-loop information mode, wherein the first discrete state update equation comprises a first stochastic steering torque related term;

determining a prediction output vector in a prediction time domain based on the first discrete state update equation, and determining a driver reference trajectory vector and a driving system reference trajectory vector, wherein the prediction output vector comprises a prediction output term that is based on the first stochastic steering torque related term; and establishing, based on the prediction output vector, the driver reference trajectory vector, and the driving system reference trajectory vector, a first driver trajectory cost function and a first driving system trajectory cost function, to obtain the game model for human-machine path tracking control.

2. The conflict control method for shared driving according to claim 1, wherein the game model for human-machine path tracking control comprises a closed-loop game model, and establishing the game model for human-machine path tracking control corresponding to the human-machine interaction action, comprises:

establishing, based on the driver's deterministic steering torque and the driver's stochastic steering torque, a second discrete state update equation for a dynamics system of the shared driving vehicle in a closed-loop information mode, wherein the second discrete state update equation comprises a second stochastic steering torque related term;

obtaining a path tracking augmentation system that comprises a human-machine preview state by augmenting the second discrete state update equation through a human-machine preview dynamic process, wherein the human-machine preview state comprises a state term based on the second stochastic steering torque related term; and establishing, based on the path tracking augmentation system, a second driver trajectory cost function and a second driving system trajectory cost function, to obtain the game model for human-machine path tracking control.

3. The conflict control method for shared driving according to claim 2, wherein obtaining the human-machine torque conflict information by solving the game model for human-machine path tracking control, comprises:

determining, based on a stochastic dynamic programming algorithm, recursive relationships for steering control value functions respectively corresponding to a driver and a driving system under a Nash equilibrium condition; and calculating, based on the second discrete state update equation and the recursive relationships, closed-loop Nash equilibrium solutions respectively corresponding to the driver and the driving system, as the human-machine torque conflict information.

4. The conflict control method for shared driving according to claim 2, wherein obtaining the human-machine torque conflict information by solving the game model for human-machine path tracking control, comprises:

determining, based on a stochastic dynamic programming algorithm, recursive relationships for steering control value functions respectively corresponding to a driver and a driving system under a Stackelberg equilibrium condition;

determining a driver reaction function based on the recursive relationship for the steering control value function corresponding to the driving system;

calculating, based on the second discrete state update equation, the driver reaction function, and the recursive relationship for the steering control value function corresponding to the driving system, an open-loop Stackelberg equilibrium solution corresponding to the driving system; and calculating, based on the open-loop Stackelberg equilibrium solution corresponding to the driving system, an open-loop Stackelberg equilibrium solution corresponding to the driver, as the human-machine torque conflict information.

5. The conflict control method for shared driving according to claim 1, wherein obtaining the human-machine torque conflict information by solving the game model for human-machine path tracking control, comprises:

obtaining a closed form solution corresponding to the game model by solving the game model for human-machine path tracking control;

obtaining, based on the closed form solution corresponding to the game model, a relationship expression between human-machine steering control and a target trajectory; and obtaining open-loop Nash equilibrium solutions respectively corresponding to a driver and a driving system by solving the relationship expression based on a convex iterative algorithm, as the human-machine torque conflict information.

6. The conflict control method for shared driving according to claim 1, wherein obtaining the human-machine torque conflict information by solving the game model for human-machine path tracking control, comprises:

converting the driving system trajectory cost function into a driving system trajectory optimization function that considers a driver reaction function;

obtaining an open-loop Stackelberg equilibrium solution corresponding to a driving system by solving the driving system trajectory optimization function; and calculating, based on the open-loop Stackelberg equilibrium solution corresponding to the driving system and the driver trajectory cost function, an open-loop Stackelberg equilibrium solution corresponding to a driver, as the human-machine torque conflict information.

7. A non-transitory computer-readable storage medium having a computer program stored thereon, which when executed by a processor, causes a conflict control method for shared driving to be implemented, wherein the conflict control method for shared driving comprises:

establishing, based on a driver's deterministic steering torque and a driver's stochastic steering torque, a game model for human-machine path tracking control corresponding to a human-machine interaction action;

obtaining human-machine torque conflict information by solving the game model for human-machine path tracking control;

determining a shared control strategy based on the human-machine torque conflict information; and controlling a shared driving vehicle based on the shared control strategy;

wherein the game model for human-machine path tracking control comprises an open-loop game model, and establishing the game model for human-machine path tracking control corresponding to the human-machine interaction action, comprises:

establishing, based on the driver's deterministic steering torque and the driver's stochastic steering torque, a first discrete state update equation for a dynamics system of the shared driving vehicle in an open-loop information mode, wherein the first discrete state update equation comprises a first stochastic steering torque related term;

determining a prediction output vector in a prediction time domain based on the first discrete state update equation, and determining a driver reference trajectory vector and a driving system reference trajectory vector, wherein the prediction output vector comprises a prediction output term that is based on the first stochastic steering torque related term; and establishing, based on the prediction output vector, the driver reference trajectory vector, and the driving system reference trajectory vector, a first driver trajectory cost function and a first driving system trajectory cost function, to obtain the game model for human-machine path tracking control.

8. The non-transitory computer-readable storage medium according to claim 7, wherein the game model for human-machine path tracking control comprises a closed-loop game model, and establishing the game model for human-machine path tracking control corresponding to the human-machine interaction action, comprises:

establishing, based on the driver's deterministic steering torque and the driver's stochastic steering torque, a second discrete state update equation for a dynamics system of the shared driving vehicle in a closed-loop information mode, wherein the second discrete state update equation comprises a second stochastic steering torque related term;

obtaining a path tracking augmentation system that comprises a human-machine preview state by augmenting the second discrete state update equation through a human-machine preview dynamic process, wherein the human-machine preview state comprises a state term based on the second stochastic steering torque related term; and establishing, based on the path tracking augmentation system, a second driver trajectory cost function and a second driving system trajectory cost function, to obtain the game model for human-machine path tracking control.

9. The non-transitory computer-readable storage medium according to claim 8, wherein obtaining the human-machine torque conflict information by solving the game model for human-machine path tracking control, comprises:

determining, based on a stochastic dynamic programming algorithm, recursive relationships for steering control value functions respectively corresponding to a driver and a driving system under a Nash equilibrium condition; and calculating, based on the second discrete state update equation and the recursive relationships, closed-loop Nash equilibrium solutions respectively corresponding to the driver and the driving system, as the human-machine torque conflict information;

or determining, based on a stochastic dynamic programming algorithm, recursive relationships for steering control value functions respectively corresponding to a driver and a driving system under a Stackelberg equilibrium condition;

determining a driver reaction function based on the recursive relationship for the steering control value function corresponding to the driving system;

calculating, based on the second discrete state update equation, the driver reaction function, and the recursive relationship for the steering control value function corresponding to the driving system, an open-loop Stackelberg equilibrium solution corresponding to the driving system; and calculating, based on the open-loop Stackelberg equilibrium solution corresponding to the driving system, an open-loop Stackelberg equilibrium solution corresponding to the driver, as the human-machine torque conflict information.

10. The non-transitory computer-readable storage medium according to claim 7, wherein obtaining the human-machine torque conflict information by solving the game model for human-machine path tracking control, comprises:

obtaining a closed form solution corresponding to the game model by solving the game model for human-machine path tracking control;

obtaining, based on the closed form solution corresponding to the game model, a relationship expression between human-machine steering control and a target trajectory; and obtaining open-loop Nash equilibrium solutions respectively corresponding to a driver and a driving system by solving the relationship expression based on a convex iterative algorithm, as the human-machine torque conflict information;

or converting the driving system trajectory cost function into a driving system trajectory optimization function that considers a driver reaction function;

obtaining an open-loop Stackelberg equilibrium solution corresponding to a driving system by solving the driving system trajectory optimization function; and calculating, based on the open-loop Stackelberg equilibrium solution corresponding to the driving system and the driver trajectory cost function, an open-loop Stackelberg equilibrium solution corresponding to a driver, as the human-machine torque conflict information.

11. An electronic device, comprising:

one or more processors; and a storage unit for storing one or more programs, which when executed by the one or more processors, cause the one or more processors to be configured to:

establish, based on a driver's deterministic steering torque and a driver's stochastic steering torque, a game model for human-machine path tracking control corresponding to a human-machine interaction action;

obtain human-machine torque conflict information by solving the game model for human-machine path tracking control;

determine a shared control strategy based on the human-machine torque conflict information; and control a shared driving vehicle based on the shared control strategy;

wherein the one or more processors are further configured to:

establish, based on the driver's deterministic steering torque and the driver's stochastic steering torque, a first discrete state update equation for a dynamics system of the shared driving vehicle in an open-loop information mode, wherein the first discrete state update equation comprises a first stochastic steering torque related term;

determine a prediction output vector in a prediction time domain based on the first discrete state update equation, and determine a driver reference trajectory vector and a driving system reference trajectory vector, wherein the prediction output vector comprises a prediction output term that is based on the first stochastic steering torque related term; and establish, based on the prediction output vector, the driver reference trajectory vector, and the driving system reference trajectory vector, a first driver trajectory cost function and a first driving system trajectory cost function, to obtain the game model for human-machine path tracking control.

12. The electronic device according to claim 11, wherein the one or more processors are further configured to:

establish, based on the driver's deterministic steering torque and the driver's stochastic steering torque, a second discrete state update equation for a dynamics system of the shared driving vehicle in a closed-loop information mode, wherein the second discrete state update equation comprises a second stochastic steering torque related term;

obtain a path tracking augmentation system that comprises a human-machine preview state by augmenting the second discrete state update equation through a human-machine preview dynamic process, wherein the human-machine preview state comprises a state term based on the second stochastic steering torque related term; and establish, based on the path tracking augmentation system, a second driver trajectory cost function and a second driving system trajectory cost function, to obtain the game model for human-machine path tracking control.

13. The electronic device according to claim 12, wherein the one or more processors are further configured to:

determine, based on a stochastic dynamic programming algorithm, recursive relationships for steering control value functions respectively corresponding to a driver and a driving system under a Nash equilibrium condition; and calculate, based on the second discrete state update equation and the recursive relationships, closed-loop Nash equilibrium solutions respectively corresponding to the driver and the driving system, as the human-machine torque conflict information.

14. The electronic device according to claim 12, wherein the one or more processors are further configured to:

determine, based on a stochastic dynamic programming algorithm, recursive relationships for steering control value functions respectively corresponding to a driver and a driving system under a Stackelberg equilibrium condition;

determine a driver reaction function based on the recursive relationship for the steering control value function corresponding to the driving system;

calculate, based on the second discrete state update equation, the driver reaction function, and the recursive relationship for the steering control value function corresponding to the driving system, an open-loop Stackelberg equilibrium solution corresponding to the driving system; and calculate, based on the open-loop Stackelberg equilibrium solution corresponding to the driving system, an open-loop Stackelberg equilibrium solution corresponding to the driver, as the human-machine torque conflict information.

15. The electronic device according to claim 11, wherein the one or more processors are further configured to:

obtain a closed form solution corresponding to the game model by solving the game model for human-machine path tracking control;

obtain, based on the closed form solution corresponding to the game model, a relationship expression between human-machine steering control and a target trajectory; and obtain open-loop Nash equilibrium solutions respectively corresponding to a driver and a driving system by solving the relationship expression based on a convex iterative algorithm, as the human-machine torque conflict information.

16. The electronic device according to claim 11, wherein the one or more processors are further configured to:

convert the driving system trajectory cost function into a driving system trajectory optimization function that considers a driver reaction function;

obtain an open-loop Stackelberg equilibrium solution corresponding to a driving system by solving the driving system trajectory optimization function; and calculate, based on the open-loop Stackelberg equilibrium solution corresponding to the driving system and the driver trajectory cost function, an open-loop Stackelberg equilibrium solution corresponding to a driver, as the human-machine torque conflict information.

* * * * *